(12) United States Patent
Lee et al.

(10) Patent No.: US 9,461,502 B2
(45) Date of Patent: *Oct. 4, 2016

(54) CONTROL METHOD FOR WIRELESS CHARGING

(71) Applicant: Samsung Electronics Co., Ltd., Gyeonggi-do (KR)

(72) Inventors: Kyung-Woo Lee, Seoul (KR); Kang-Ho Byun, Gyeonggi-do (KR); Ho-Seong Lee, Gyeonggi-do (KR); Hee-Won Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 254 days.

This patent is subject to a terminal disclaimer.

(21) Appl. No.: 14/269,686

(22) Filed: May 5, 2014

(65) Prior Publication Data

US 2014/0327409 A1    Nov. 6, 2014

(30) Foreign Application Priority Data

May 3, 2013 (KR) .......................... 10-2013-0050293

(51) Int. Cl.
*H01M 10/44* (2006.01)
*H01M 10/46* (2006.01)
*H02J 7/02* (2016.01)
*H04B 5/00* (2006.01)
*H02J 7/00* (2006.01)
*H02J 5/00* (2016.01)

(52) U.S. Cl.
CPC ............. *H02J 7/025* (2013.01); *H04B 5/0037* (2013.01); *H04B 5/0075* (2013.01); *H02J 5/005* (2013.01); *H02J 2007/0096* (2013.01); *H02J 2007/0098* (2013.01)

(58) Field of Classification Search
CPC .......... H02J 5/005; H02J 50/00; H02J 7/025; H02J 7/0042; H02J 7/355
USPC .................. 320/107, 108, 114, 115; 307/104
See application file for complete search history.

(56) References Cited

U.S. PATENT DOCUMENTS

| 2010/0217553 | A1 | 8/2010 | Von Novak et al. |
| 2011/0062788 | A1 | 3/2011 | Chen et al. |
| 2012/0163619 | A1 | 6/2012 | Kinoshita et al. |
| 2012/0223589 | A1 | 9/2012 | Low et al. |
| 2013/0050889 | A1 | 2/2013 | Hwang et al. |

(Continued)

FOREIGN PATENT DOCUMENTS

| EP | 2 568 527 | 3/2013 |
| EP | 2 573 902 | 3/2013 |

(Continued)

OTHER PUBLICATIONS

European Search Report dated Dec. 4, 2014 issued in counterpart application No. 14166586.9-1505.

*Primary Examiner* — Edward Tso
(74) *Attorney, Agent, or Firm* — The Farrell Law Firm, P.C.

(57) ABSTRACT

A control method for performing wireless charging in a wireless power receiver is disclosed. The control method includes receiving charging power from a wireless power transmitter; detecting transition of the wireless power receiver from a Stand Alone (SA) mode to a Non Stand Alone (NSA) mode; upon detecting the mode transition, generating a message including address information used to re-connect with the wireless power transmitter; and transmitting the message to the wireless power transmitter.

15 Claims, 16 Drawing Sheets

(56) References Cited

U.S. PATENT DOCUMENTS

2014/0253028 A1 9/2014 Lee et al.
2014/0285141 A1* 9/2014 Lee .................. H02J 7/025
　　　　　　　　　　　　　　　　　　　　320/108

FOREIGN PATENT DOCUMENTS

| JP | 2012-147417 | 8/2012 |
| KR | 1020130023618 | 3/2013 |
| KR | 1020140110500 | 9/2014 |

* cited by examiner

CONTROL METHOD FOR WIRELESS CHARGING

PRIORITY

This application claims priority under 35 U.S.C. §119(a) to a Korean Patent Application filed in the Korean Intellectual Property Office on May 3, 2013 and assigned Serial No. 10-2013-0050293, the entire disclosure of which is incorporated herein by reference.

BACKGROUND

1. Field of Invention

The present invention generally relates to a wireless power transmitter, a wireless power receiver and a control method thereof, and more particularly, to a wireless power transmitter capable of wirelessly transmitting charging power, a wireless power receiver capable of wirelessly receiving charging power, and a control method thereof

2. Description of the Related Art

Mobile terminals such as cellular phones and Personal Digital Assistants (PDAs) are powered by a rechargeable battery due to their portability. In order to charge the battery, electrical energy may be supplied to the battery of the mobile terminal using a separate charging device. Typically, the charging device and the battery have separate contact terminals mounted on their exposed surfaces, and the charging device and the battery may be electrically connected by causing their contact terminals to be in contact with each other.

However, this contact type charging scheme is subject to contamination due to foreign matter since the contact terminals are exposed to the outside, so the battery charging may not be correctly performed. The battery also may not be correctly charged when the contact terminals are exposed to moisture.

In order to solve these and other problems, wireless or non-contact charging technology has recently been developed and utilized in many electronic devices.

The wireless charging technology, which is based on wireless power transmission/reception, may ensure a system in which a battery may be automatically charged by simply placing, for example, a cellular phone on a charging pad without connecting the cellular phone to a separate charging connector. Typically, wireless electronic toothbrushes or cordless electric shavers are well known as devices employing wireless charging technology. The wireless charging technology may improve the waterproof performance of electronic products by wirelessly charging the electronic products, and may ensure the portability of electronic devices because of the unnecessity of a wired charger. In the coming era of electric vehicles, the related technologies are expected to significantly evolve.

The wireless charging technology may be roughly classified into a coil-based electromagnetic induction scheme, a resonance scheme, and Radio Frequency (RF)/micro wave radiation scheme that converts electrical energy into microwaves and transfers the microwaves.

Up to now, the electromagnetic induction scheme has been widely used. However, as experiments of wirelessly transmitting power from a distance of tens of meters using microwaves have been recently successful at home and abroad, it seems that all electronic products may be wirelessly charged without wires anytime anyplace in the near future.

The electromagnetic induction-based power transmission method corresponds to a scheme of transmitting power between a primary coil and a secondary coil. If a magnet moves around a coil, an induced current may be generated. Based on this principle, a transmitter generates a magnetic field, and a current is induced in a receiver due to a change in the magnetic field, creating energy. This phenomenon is called an electromagnetic induction phenomenon, and a power transmission method employing this phenomenon is excellent in energy transmission efficiency.

As for the resonance scheme, electricity is wirelessly transferred by using the resonance-based power transmission principle as a coupled mode theory even if an electronic device is apart from a charging device by several meters. The wireless charging system causes electromagnetic waves containing electrical energy to resonate, and the resonating electrical energy may be directly transferred only to an electronic device having the resonant frequency. The unused electrical energy may be reabsorbed as an electromagnetic field instead of spreading in the air, so the resonating electrical energy, unlike other electromagnetic waves, may not affect the nearby devices or human bodies.

Although research has recently been conducted on the wireless charging scheme, no standards have been proposed for wireless charging priority, search for a wireless power transmitter and a wireless power receiver, selection of a frequency for communication between a wireless power transmitter and a wireless power receiver, adjustment of wireless power, selection of a matching circuit, distribution of communication time for each wireless power receiver in one charging cycle, and the like. In particular, there is a need for a standard for the configuration and procedure in which a wireless power receiver selects a wireless power transmitter from which the wireless power receiver will receive wireless power.

In particular, there is a need to develop a method in which during discharge of its battery, a wireless power receiver may perform communication with a wireless power transmitter by receiving charging power from the wireless power transmitter. The wireless power receiver may store a stack for communication in its Application Processor (AP), and may load the stack from the AP and communicate with the wireless power transmitter in a process of performing communication with the wireless power transmitter.

However, if its battery is discharged, the wireless power receiver may not load the stack from the AP, so communication for wireless charging may not be performed.

SUMMARY

The present invention has been made to address at least the above-mentioned problems and/or disadvantages and to provide at least the advantages described below.

Accordingly, an aspect of the present invention is to provide a wireless power receiver capable of performing communication with a wireless power transmitter even during discharge of its battery, and a control method thereof.

Another aspect of the present invention is to provide a wireless power transmitter for performing communication in response to the battery discharge, and a control method thereof.

In accordance with an aspect of the present invention, there is provided a control method for performing wireless charging in a wireless power receiver. The control method includes receiving charging power from a wireless power transmitter; detecting transition of the wireless power receiver from a Stand Alone (SA) mode to a Non Stand Alone (NSA) mode; upon detecting the mode transition, generating a message including address information used to re-connect with the wireless power transmitter; and transmitting the message to the wireless power transmitter.

In accordance with another aspect of the present invention, there is provided a control method for performing wireless charging in a wireless power transmitter. The control method includes transmitting charging power to a wireless power receiver; receiving, from the wireless power receiver, a message including address information used to re-connect with the wireless power transmitter; and upon receiving the message from the wireless power receiver, reconnecting with the wireless power receiver using the address information.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

The following description with reference to the accompanying drawings is provided to assist in a comprehensive understanding of embodiments of the present invention as defined by the claims and their equivalents. It includes various specific details to assist in that understanding but these are to be regarded as merely examples. Accordingly, those of ordinary skilled in the art will recognize that various changes and modifications of the embodiments described herein can be made without departing from the scope and spirit of the present invention. In addition, descriptions of well-known functions and constructions may be omitted for clarity and conciseness.

The terms and words used in the following description and claims are not limited to their dictionary meanings, but are merely used to enable a clear and consistent understanding of the present invention. Accordingly, it should be apparent to those skilled in the art that the following description of embodiments of the present invention is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially", it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
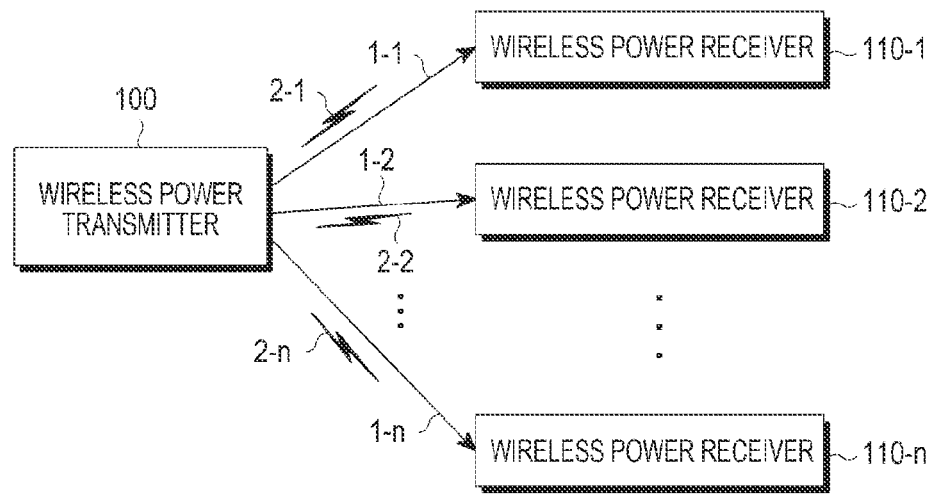
FIG. 1 illustrates the concept of the overall operation of a wireless charging system.

FIG. 1 illustrates the concept of the overall operation of a wireless charging system. As illustrated in FIG. 1, the wireless charging system includes, a wireless power transmitter 100 and at least one wireless power receivers 110-1, 110-2 and 110-n.

The wireless power transmitter 100 wirelessly transmits power 1-1, 1-2 and 1-n to the wireless power receivers 110-1, 110-2 and 110-n, respectively. More specifically, the wireless power transmitter 100 wirelessly transmits the power 1-1, 1-2 and 1-n only to the wireless power receiver(s) that is authenticated by performing a predetermined authentication procedure.

The wireless power transmitter 100 forms an electrical connection to the wireless power receivers 110-1, 110-2 and 110-n. For example, the wireless power transmitter 100 may transmit wireless power in the form of electromagnetic wave to the wireless power receivers 110-1, 110-2 and 110-n.

The wireless power transmitter 100 may perform bi-directional communication with the wireless power receivers 110-1, 110-2 and 110-n. The wireless power transmitter 100 and the wireless power receivers 110-1, 110-2 and 110-*n* process or transmit/receive packets 2-1, 2-2 and 2-*n*, which are configured in a predetermined frame. The frame will be described in detail below. The wireless power receiver may be implemented as, for example, a mobile communication terminal, a Personal Digital Assistants (PDA), a Personal Multimedia Player (PMP), a smart phone, and the like.

The wireless power transmitter 100 wirelessly supplies power to the plurality of wireless power receivers 110-1, 110-2 and 110-*n*. For example, the wireless power transmitter 100 may transmit power to the plurality of wireless power receivers 110-1, 110-2 and 110-*n* using the resonance scheme. If the wireless power transmitter 100 adopts the resonance scheme, the distance between the wireless power transmitter 100 and the plurality of wireless power receivers 110-1, 110-2 and 110-*n* should be less than 30 m. If the wireless power transmitter 100 adopts the electromagnetic induction scheme, the distance between the wireless power transmitter 100 and the plurality of wireless power receivers 110-1, 110-2 and 110-*n* should be preferably less than 10 cm.

The wireless power receivers 110-1, 110-2 and 110-*n* receive wireless power from the wireless power transmitter 100, and charge batteries mounted therein with the received power. The wireless power receivers 110-1, 110-2 and 110-*n* may transmit, to the wireless power transmitter 100, a signal for requesting transmission of wireless power, information needed for reception of wireless power, status information of the wireless power receiver, information for control of the wireless power transmitter 100, and the like. The transmission signal information will be described in detail below.

The wireless power receivers 110-1, 110-2 and 110-*n* may send a message indicating their charging status to the wireless power transmitter 100.

The wireless power transmitter 100 may include a display means such as a display, and displays the status of each of the wireless power receivers 110-1, 110-2 and 110-*n* on the display based on a message received from each of the wireless power receivers 110-1, 110-2 and 110-*n*. In addition, the wireless power transmitter 100 may display, on the display, the time that is expected until each of the wireless power receivers 110-1, 110-2 and 110-*n* is fully charged.

The wireless power transmitter 100 may transmit a control signal for disabling the wireless charging function to each of the wireless power receivers 110-1, 110-2 and 110-*n*. Upon receiving the control signal for disabling the wireless charging function from the wireless power transmitter 100, the wireless power receiver disables the wireless charging function.

Figure 2:
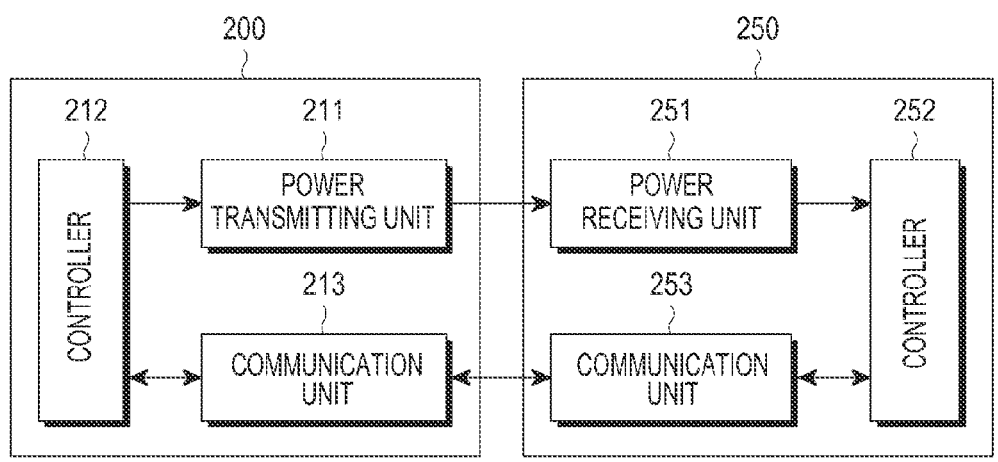
FIG. 2 is a block diagram of a wireless power transmitter and a wireless power receiver according to an embodiment of the present invention.

FIG. 2 is a block diagram of a wireless power transmitter and a wireless power receiver according to an embodiment of the present invention.

As illustrated in FIG. 1, a wireless power transmitter 200 includes a power transmitting unit 211, a controller 212, and a communication unit 213. A wireless power receiver 250 may include a power receiving unit 251, a controller 252 and a communication unit 253.

The power transmitting unit 211 supplies the power required by the wireless power transmitter 200, and may wirelessly supply the power to the wireless power receiver 250. The power transmitting unit 211 supplies power in the form of an Alternating Current (AC) waveform, or may supply power in the form of Direct Current (DC) waveform. In the latter case, the power transmitting unit 211 converts the DC waveform into an AC waveform using an inverter, and supplies the power in the form of an AC waveform. The power transmitting unit 211 may be implemented in the form of built-in battery, or may be implemented in the form of power receiving interface to receive power from the outside and supply the received power to the other components. It will be apparent to those of ordinary skill in the art that any means may replace the power transmitting unit 211 as long as it can supply power in the form of a predetermined AC waveform.

In addition, the power transmitting unit 211 may provide AC waveforms to the wireless power receiver 250 in the form of electromagnetic waves. The power transmitting unit 211 may further include a resonance circuit, so the power transmitting unit 211 transmits or receives predetermined electromagnetic waves. If the power transmitting unit 211 is implemented with a resonance circuit, an inductance L of a loop coil in the resonance circuit may be subject to change. It will be apparent to those of ordinary skill in the art that any means may replace the power transmitting unit 211 as long as it can transmit and receive electromagnetic waves.

The controller 212 controls the overall operation of the wireless power transmitter 200. The controller 212 may control the overall operation of the wireless power transmitter 200 using an algorithm, a program or an application, each of which is read from a storage (not shown) and required for the control. The controller 212 may be implemented in the form of a Central Processing Unit (CPU), a microprocessor, a minicomputer, and the like. A detailed operation of the controller 212 will be described in more detail below.

The communication unit 213 performs communication with the wireless power receiver 250 using a predetermined communication scheme. The communication unit 213 may perform communication with the communication unit 253 of the wireless power receiver 250, using Near Field Communication (NFC), Zigbee, Infrared Data Association (IrDA), Visible Light Communication (VLC), Bluetooth, Bluetooth Low Energy (BLE), and the like. The communication unit 213 may employ a Carrier Sense Multiple Access with Collision Avoidance (CSMA/CA) algorithm. The above communication schemes are merely illustrative, and the scope of the present invention will not limited to a specific communication scheme performed in the communication unit 213.

The communication unit 213 transmits a signal for information about the wireless power transmitter 200. The communication unit 213 may unicast, multicast, or broadcast the signal. Table 1 below illustrates a data structure of a signal transmitted from the wireless power transmitter 200 according to an embodiment of the present invention. The wireless power transmitter 200 transmits a signal having the following frame at a preset cycle, and the signal may be called herein a 'Notice' signal.

TABLE 1

| frame type | protocol version | sequence number | network ID | RX to Report (schedule mask) | Reserved | Number of Rx |
|---|---|---|---|---|---|---|
| Notice | 4 bit | 1 Byte | 1 Byte | 1 Byte | 5 bit | 3 bit |

In Table 1, a 'frame type' field, which is a field indicating a type of the signal, indicates that the signal is a 'Notice' signal. A 'protocol version' field, which is a field indicating a protocol type of a communication scheme, may be allocated, for example, 4 bits. A 'sequence number' field, which is a field indicating a sequence number of the signal, may be allocated, for example, 1 byte. The sequence number may increase one by one in response to, for example, a signal transmission/reception phase. A 'network ID' field, which is a field indicating a network ID of the wireless power transmitter 200, may be allocated, for example, 1 byte. A 'Rx to Report (schedule mask)' field, which is a field indicating the wireless power receivers that will make a report to the wireless power transmitter 200, may be allocated, for example, 1 byte. Table 2 below illustrates the 'Rx to Report (schedule mask)' field according to an embodiment of the present invention.

TABLE 2

| Rx to Report(schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

In Table 2, Rx1 to Rx8 may correspond to first to eighth wireless power receivers. The 'Rx to Report (schedule mask)' field may be implemented to cause a wireless power receiver with a schedule mask number=1 to make a report.

In Table 1, a 'Reserved' field, which is a field reserved for future use, may be allocated, for example, 5 bits. A 'Number of Rx' field, which is a field indicating the number of wireless power receivers around the wireless power transmitter 200, may be allocated, for example, 3 bits.

The communication unit 213 receives power information from the wireless power receiver 250. The power information includes at least one of the capacity, battery level, the number of chargings (i.e., charging times of a battery), usage, battery capacity and battery percentage of the wireless power receiver 250. The communication unit 213 transmits a charging function control signal for controlling the charging function of the wireless power receiver 250. The charging function control signal may be a control signal for enabling or disabling the charging function by controlling the power receiving unit 251 of the wireless power receiver 250. More specifically, the power information may include information about insertion of a wired charging terminal, transition from a Stand Alone (SA) mode to a Non Stand Alone (NSA) mode, and release of error situations, all of which will be described below.

The communication unit 213 may receive not only the signal from the wireless power receiver 250, but also the signal from at least one other wireless power transmitter (not shown). For example, the communication unit 213 may receive the 'Notice' signal of the frame in Table 1 from another wireless power transmitter.

Although the power transmitting unit 211 and the communication unit 213 are configured as different hardware structures in FIG. 2, so the wireless power transmitter 200 seems to communicate in an out-band way, this is merely illustrative. In the present invention, the power transmitting unit 211 and the communication unit 213 may be implemented as a single hardware structure, so the wireless power transmitter 200 may perform communication in an in-band way.

The wireless power transmitter 200 transmits and receives a variety of signals to/from the wireless power receiver 250. Accordingly, a process in which the wireless power receiver 250 joins the wireless power network managed by the wireless power transmitter 200 and a process in which the wireless power receiver 250 is charged through wireless power transmission/reception are performed, and a detailed description thereof will be given below.

Figure 3:
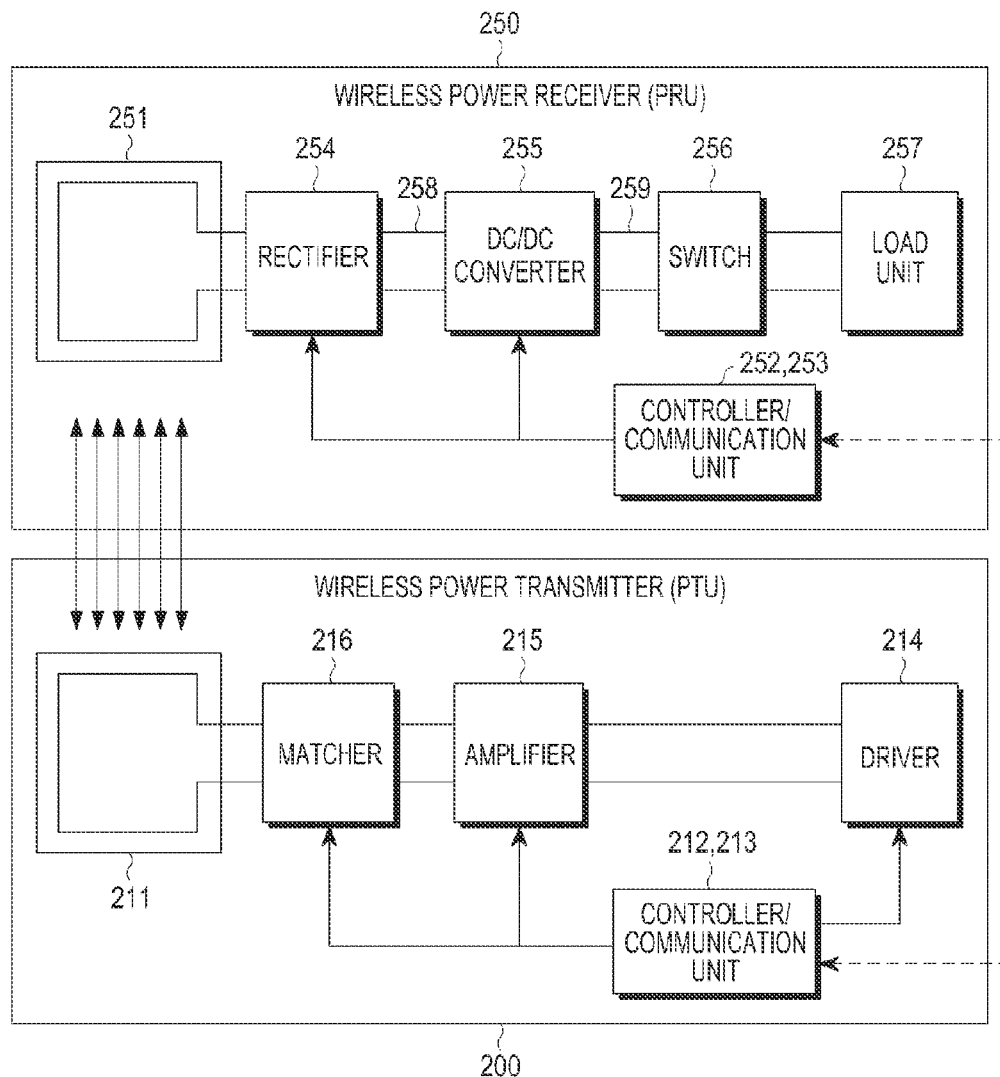
FIG. 3 is a detailed block diagram of a wireless power transmitter and a wireless power receiver according to an embodiment of the present invention.

FIG. 3 is a detailed block diagram of a wireless power transmitter and a wireless power receiver according to an embodiment of the present invention.

As illustrated in FIG. 3, the wireless power transmitter (or Power Transmission Unit (PTU)) 200 includes the power transmitting unit 211, a controller/communication unit (or MCU & Out-of-band Signaling unit) 212/213, a driver 214, an amplifier 215, and a matcher 216. The wireless power receiver (or Power Reception Unit (PRU)) 250 includes the power receiving unit 251, a controller/communication unit (or MCU & Out-of-band Signaling unit) 252/253, a rectifier 254, a DC/DC converter 255, a switch 256, and a load unit 257.

The driver 214 outputs DC power having a preset voltage value. The voltage value of the DC power output from the driver 214 is controlled by the controller/communication unit 212/213.

A DC current output from the driver 214 is output to the amplifier 215. The amplifier 215 amplifies the DC current with a preset gain. In addition, the amplifier 215 converts the DC current into an AC current based on the signal received from the controller/communication unit 212/213. Accordingly, the amplifier 215 outputs an AC current.

The matcher 216 performs impedance matching. For example, the matcher 216 adjusts the impedance seen from the matcher 216 to control the output power to have high efficiency and high power. The matcher 216 adjusts the impedance under controller of the controller/communication unit 212/213. The matcher 216 may include at least one of a coil and a capacitor. The controller/communication unit 212/213 may control a connection status to at least one of the coil and the capacitor, and performs impedance matching according thereto.

The power transmitting unit 211 transmits the input AC power to the power receiving unit 251. Each of the power transmitting unit 211 and the power receiving unit 251 may be implemented with a resonance circuit having the same resonant frequency. For example, the resonant frequency may be determined as 6.78 MHz.

The controller/communication unit 212/213 performs communication with the controller/communication unit 252/253 in the wireless power receiver 250, and may perform, for example, bi-directional communication at a frequency of 2.4 GHz.

The power receiving unit 251 receives charging power.

The rectifier 254 rectifies the wireless power received at the power receiving unit 251 into DC power, and may be implemented in the form of, for example, a bridge diode. The DC/DC converter 255 converts the rectified power with a preset gain. For example, the DC/DC converter 255 may convert the rectified power so that its output terminal 259 may have a voltage of 5V. The minimum value and maximum value of a voltage applicable to a front end 258 of the DC/DC converter 255 may be set in advance.

The switch 256 connects the DC/DC converter 255 to the load unit 257. The switch 256 keeps an ON/OFF status under control of the controller 252. If the switch 256 is in an ON status, the load unit 257 stores the converted power received from the DC/DC converter 255.

Figure 4:
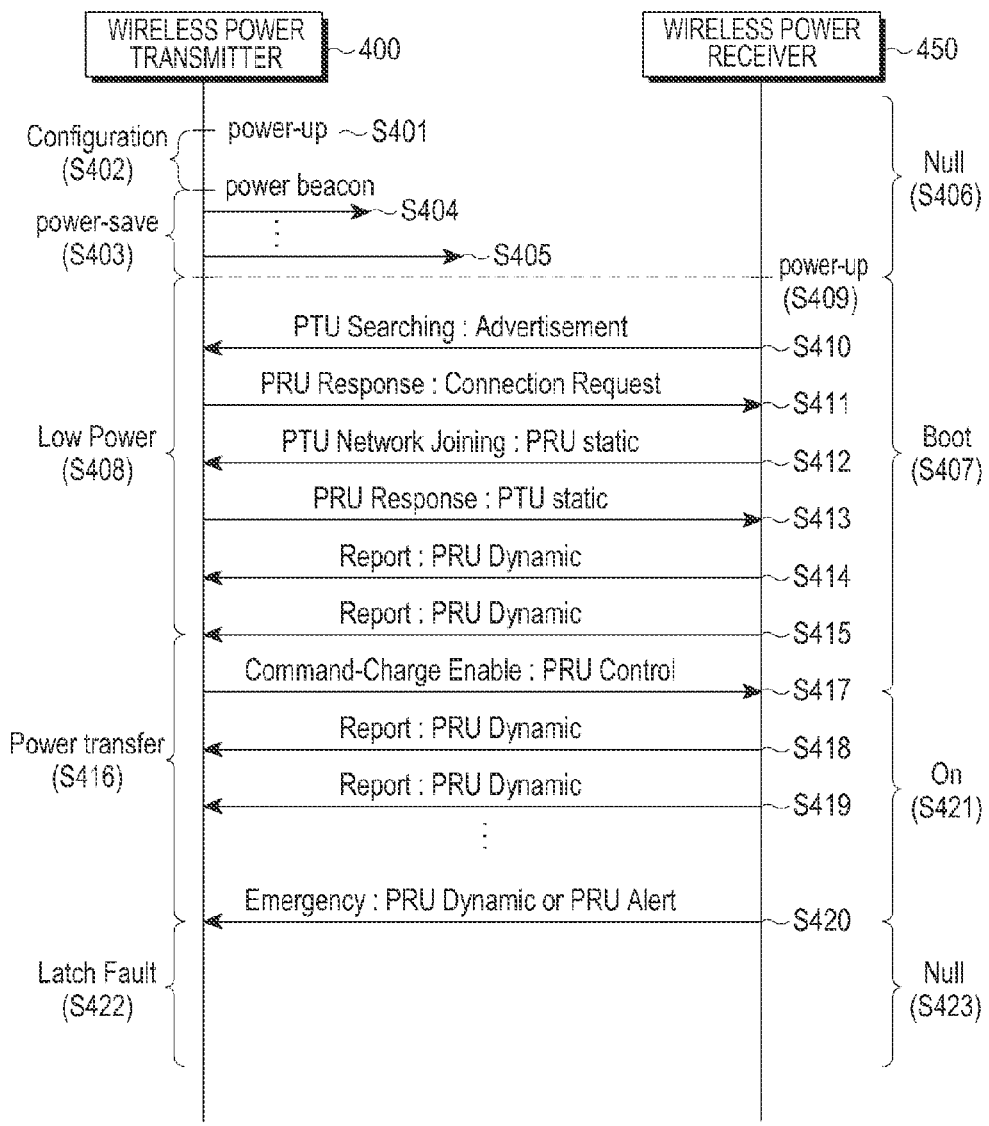
FIG. 4 is a flow diagram illustrating operations of a wireless power transmitter and a wireless power receiver according to an embodiment of the present invention.

FIG. 4 is a flow diagram illustrating operations of a wireless power transmitter and a wireless power receiver according to an embodiment of the present invention.

As illustrated in FIG. 4, a wireless power transmitter (or PTU) 400 is powered up in step S401. Upon power up, the wireless power transmitter 400 configures (or sets) the environment in step S402.

The wireless power transmitter 400 enters a power save mode in step S403. In the power save mode, the wireless power transmitter 400 may apply different detection-purpose power beacons at their own cycles, and a detailed description thereof will be given with reference to FIG. 6. For example, as in FIG. 4, the wireless power transmitter 400 may apply detection-purpose power beacons 404 and 405, and the detection-purpose power beacons 404 and 405 may be different from each other in magnitude of a power value. All or some of the detection-purpose power beacons 404 and 405 may have the power that can drive a communication unit of a wireless power receiver (or PRU) 450. For example, the wireless power receiver 450 performs communication with the wireless power transmitter 400 by driving its communication unit by means of all or some of the detection-purpose power beacons 404 and 405. The above status is referred to as a null status S406.

The wireless power transmitter 400 may detect a change in load, which is caused by the arrangement of the wireless power receiver 450. The wireless power transmitter 400 enters a low power mode in step S408. The low power mode will be described in detail with reference to FIG. 6. The wireless power receiver 450 drives its communication unit based on the power received from the wireless power transmitter 400 in step S409.

The wireless power receiver 450 transmits a PTU searching signal to the wireless power transmitter 400 in step S410. The wireless power receiver 450 transmits the PTU searching signal as an Advertisement signal that is based on Bluetooth Low Energy (BLE). The wireless power receiver 450 may periodically transmit the PTU searching signal and receive a response signal from the wireless power transmitter 400, or may transmit the PTU searching signal until a preset time has arrived.

Upon receiving the PTU searching signal from the wireless power receiver 450, the wireless power transmitter 400 transmits a PRU Response signal in step S411. The response signal may be used to form a connection between the wireless power transmitter 400 and the wireless power receiver 450.

The wireless power receiver 450 transmits a PRU static signal in step S412. The PRU static signal may be a signal indicating a status of the wireless power receiver 450, and may be used to request joining the wireless power network managed by the wireless power transmitter 400.

The wireless power transmitter 400 transmits a PTU static signal in step S413. The PTU static signal transmitted by the wireless power transmitter 400 may be a signal indicating the capability of the wireless power transmitter 400.

If the wireless power transmitter 400 and the wireless power receiver 450 exchange the PRU static signal and the PTU static signal with each other, the wireless power receiver 450 periodically transmits a PRU Dynamic signal in steps S414 and S415. The PRU Dynamic signal may include information about at least one parameter measured in the wireless power receiver 450. For example, the PRU Dynamic signal may include information about a voltage at a rear end of a rectifier in the wireless power receiver 450. The above status of the wireless power receiver 450 is referred to as a boot status S407.

The wireless power transmitter 400 enters a power transfer mode in step S416, and the wireless power transmitter 400 transmits a PRU command signal, which is a command signal for enabling the wireless power receiver 450 to perform charging, in step S417. In the power transfer mode, the wireless power transmitter 400 transmits charging power.

The PRU command signal transmitted by the wireless power transmitter 400 may include information for enabling/disabling the charging of the wireless power receiver 450, and information for permitting the charging of the wireless power receiver 450. The PRU command signal may be transmitted if the wireless power transmitter 400 commands to change the status of the wireless power receiver 450, or may be transmitted at a preset cycle of, for example, 250 ms. The wireless power receiver 450 changes the configuration according to the PRU command signal, and transmits a PRU Dynamic signal for reporting the status of the wireless power receiver 450 in steps S418 and S419. The PRU Dynamic signal transmitted by the wireless power receiver 450 may include information about at least one of voltage, current, PRU status, and temperature. The above status of the wireless power receiver 450 is referred to as an ON status S421.

The PRU Dynamic signal may have a data structure as illustrated in Table 3.

TABLE 3

| Field | octets | description | use | units |
|---|---|---|---|---|
| optional fields | 1 | defines which optional fields are populated | mandatory | |
| Vrect | 2 | voltage at diode output | mandatory | mV |
| Irect | 2 | current at diode output | mandatory | mA |
| Vout | 2 | voltage at charge/battery port | optional | mV |
| Iout | 2 | current at charge/battery port | optional | mA |
| temperature | 1 | temperature of PRU | optional | Deg C. from −40 C. |
| Vrect min dyn | 2 | Vrect low limit(dynamic value) | optional | mV |
| Vrect set dyn | 2 | desired Vrect (dynamic value) | optional | mV |
| Vrect high dyn | 2 | Vrect high limit (dynamic value) | optional | mV |
| PRU alert | 1 | warnings | mandatory | Bit field |
| RFU(Reserved for Future Use) | 3 | undefined | | |

The PRU Dynamic signal, as illustrated in Table 3, may include at least one of information about optional fields, information about a voltage at a rear end of a rectifier of the wireless power receiver Vrect, information about a current at the rear end of the rectifier of the wireless power receiver Irect, information about a voltage at a rear end of a DC/DC converter of the wireless power receiver Vout, information about a current at the rear end of the DC/DC converter of the wireless power receiver Iout, temperature information, information about the minimum voltage at the rear end of the rectifier of the wireless power receiver Vrect min dyn, information about the optimal voltage at the rear end of the rectifier of the wireless power receiver Vrect set dyn, information about the maximum voltage at the rear end of the rectifier of the wireless power receiver Vrect high dyn, and alert information PRU alert.

The alert information ('PRU alert') may be formed in a data structure as illustrated in Table 4.

TABLE 4

| 7 | 6 | 5 | 4 | 3 | 2 | 1 | 0 |
|---|---|---|---|---|---|---|---|
| over voltage | over current | over temperature | charge complete | TA detect | transition | restart request | RFU |

The alert information may include, as illustrated in Table 4, 'over voltage' information, 'over current' information, 'over temperature' information, 'charge complete' information, 'TA detect' information (for detecting insertion of a wired charging terminal (or Travel Adapter (TA) terminal)), 'transition' information (for transition between the SA mode and the NSA mode), 'restart request' information and the like.

The wireless power receiver 450 performs charging by receiving a PRU command signal. For example, if the wireless power transmitter 400 has power enough to charge the wireless power receiver 450, the wireless power transmitter 400 transmits a PRU command signal for enabling the charging. The PRU command signal may be transmitted every time the charging status is changed. The PRU command signal may be transmitted every 250 ms for example, or may be transmitted when there is a change in parameters. The PRU command signal may be set such that the PRU command signal should be transmitted within a preset threshold time (e.g., one second) even though there is no change in a parameter.

The wireless power receiver 450 may detect occurrence of an error. The wireless power receiver 450 transmits an alert signal to the wireless power transmitter 400 in step S420. The alert signal may be transmitted as a PRU Dynamic signal, or may be transmitted as a PRU alert signal. For example, the wireless power receiver 450 may reflect the error situations in the PRU alert field in Table 3, and transmit the results to the wireless power transmitter 400. Alternatively, the wireless power receiver 450 may transmit a single PRU alert signal indicating the error situations to the wireless power transmitter 400. Upon receiving the alert signal, the wireless power transmitter 400 enters a latch fault mode in step S422. The wireless power receiver 450 enters a null status in step S423.

Figure 5:
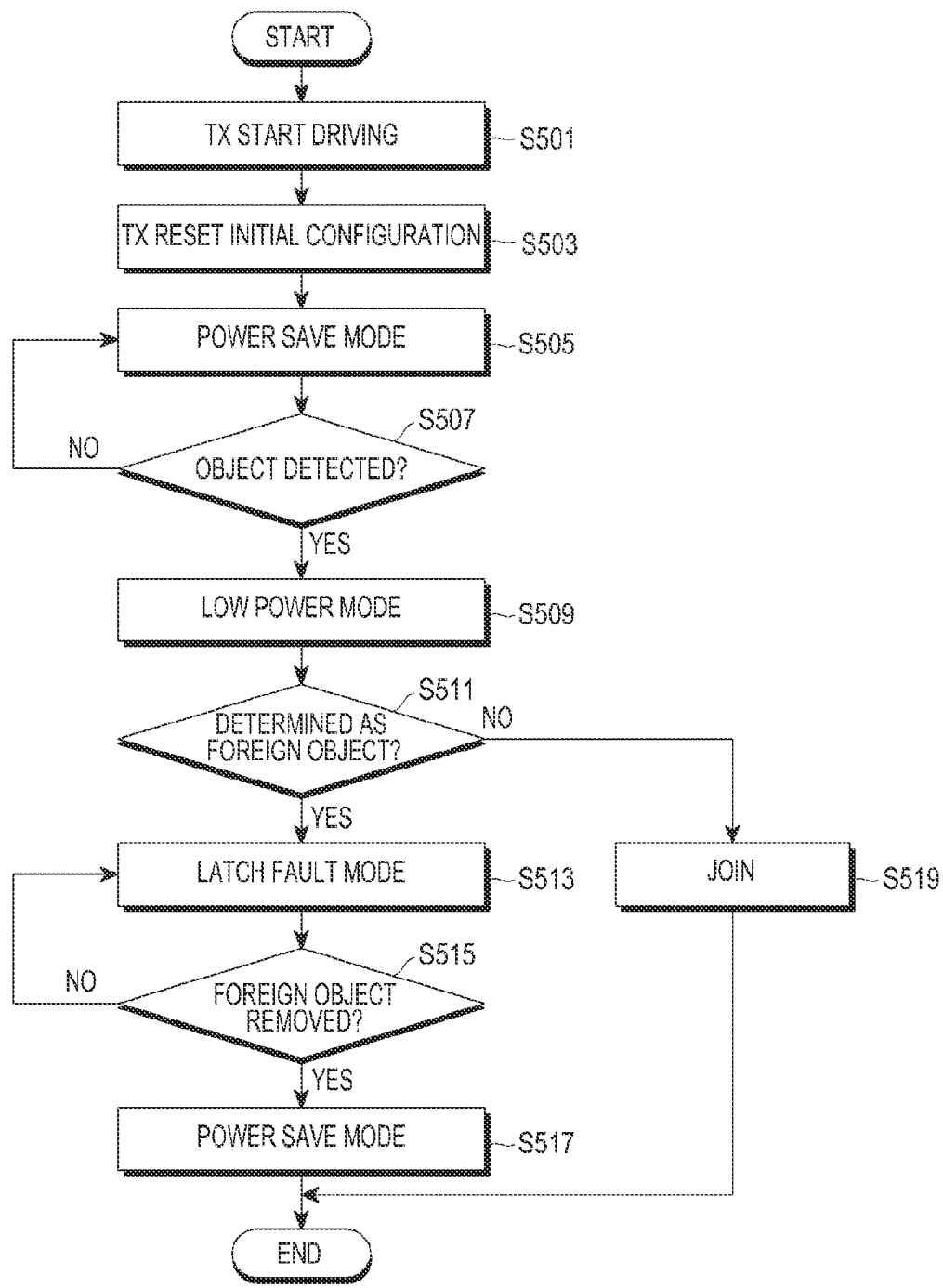
FIG. 5 is a flowchart illustrating operations of a wireless power transmitter and a wireless power receiver according to another embodiment of the present invention.
Figure 6:
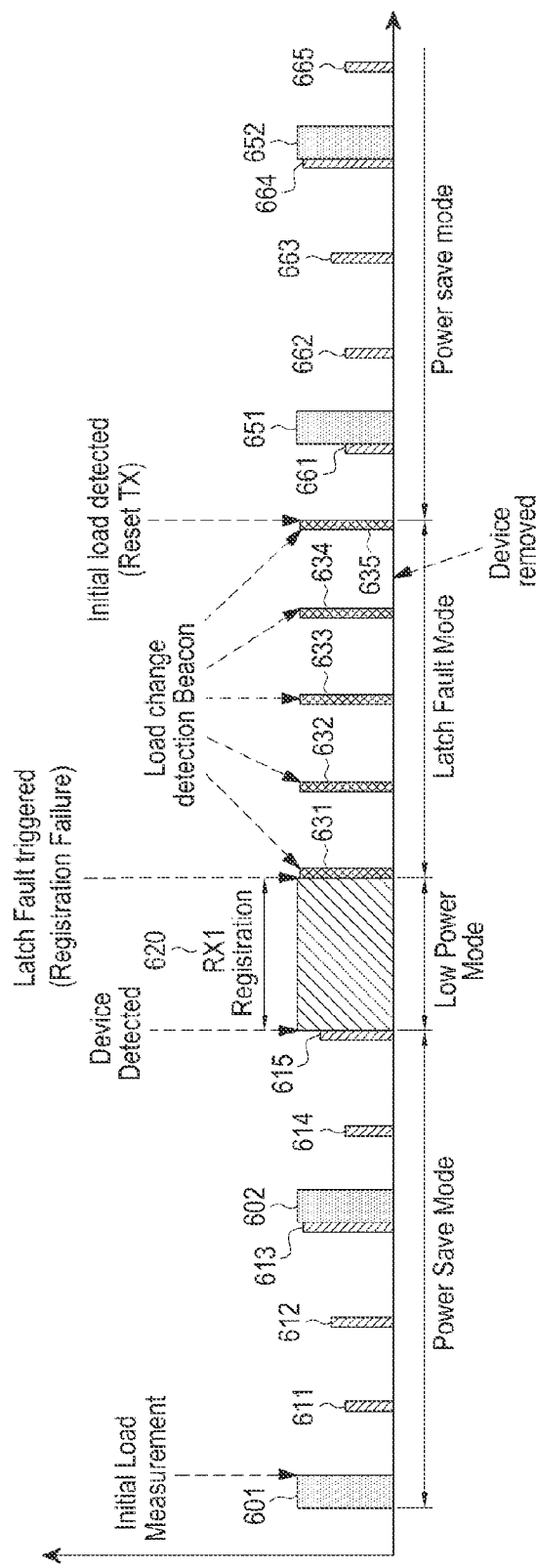
FIG. 6 is a time axis graph for power applied by a wireless power transmitter.

FIG. 5 is a flowchart illustrating operations of a wireless power transmitter and a wireless power receiver according to another embodiment of the present invention. The control method in FIG. 5 will be described in more detail with reference to FIG. 6. FIG. 6 is a time axis graph for power applied by a wireless power transmitter in an embodiment of FIG. 5.

As illustrated in FIG. 5, a wireless power transmitter starts its driving in step S501. In addition, the wireless power transmitter resets an initial configuration (or initial settings) in step S503. The wireless power transmitter enters the power save mode in step S505. The power save mode may correspond to an interval in which the wireless power transmitter applies powers having different power levels to its power transmitting unit. For example, the power save mode may correspond to an interval in which the wireless power transmitter applies second detection powers 601 and 602 and third detection powers 611, 612, 613, 614 and 615 in FIG. 6, to the power transmitting unit. The wireless power transmitter may periodically apply the second powers 601 and 602 at a second cycle, and when applying the second powers 601 and 602, the wireless power transmitter may apply the second powers 601 and 602 for a second period. The wireless power transmitter may periodically apply the third powers 611, 612, 613, 614 and 615 at a third cycle, and when applying the third powers 611, 612, 613, 614 and 615, the wireless power transmitter may apply the third powers 611, 612, 613, 614 and 615 for a third period. Although a power value for each of the third powers 611, 612, 613, 614 and 615 is illustrated as being different from each other, the power value for each of the third powers 611, 612, 613, 614 and 615 may be different from, or equal to, each other.

For example after outputting the third power 611, the wireless power transmitter may output the third power 612 having the same power level. If the wireless power transmitter outputs the third power having the same power level, the third power may have a power level capable of detecting the lowest-power wireless power receiver (e.g., a wireless power receiver in category 1, with category 1 denoting the lowest-power wireless power receiver).

As another example, after outputting the third power 611, the wireless power transmitter may output the third power 612 having a different power level. If the wireless power transmitter outputs the third powers having a different power level, each of the third powers may correspond to a power level capable of detecting wireless power receivers in categories 1 to 5. For example, the third power 611 may have a power level capable of detecting a wireless power receiver in category 1, the third power 612 may have a power level capable of detecting a wireless power receiver in category 3, and the third power 613 may have a power level capable of detecting a wireless power receiver in category 5. For example, category 1 refers to the lowest-power wireless power receiver, and category 5 refers to the highest-power wireless power receiver.

The second powers 601 and 602 may be the power that can drive the wireless power receiver. More specifically, the second powers 601 and 602 may have a power level capable of driving a controller and a communication unit in the wireless power receiver.

The wireless power transmitter applies the second powers 601 and 602 and the third powers 611, 612, 613, 614 and 615 to the power receiving unit at a second cycle and a third cycle, respectively. If the wireless power receiver is placed on the wireless power transmitter, the impedance seen at one point of the wireless power transmitter may be changed. The wireless power transmitter detects the change in impedance while the second powers 601 and 602 and the third powers 611, 612, 613, 614 and 615 are applied. For example, the wireless power transmitter may detect a change in impedance while applying the third power 615. Accordingly, the wireless power transmitter detects an object in step S507. If no object is detected in step S507, the wireless power transmitter remains in the power save mode, in which the wireless power transmitter periodically applies different powers, in step S505.

On the other hand, if an object is detected due to the change in impedance in step S507, the wireless power transmitter enters the low power mode in operation S509. The low power mode is a mode in which the wireless power transmitter applies driving power having a power level capable of driving a controller and a communication unit in the wireless power receiver. For example, in FIG. 6, the wireless power transmitter applies driving power 620 to its power transmitting unit. The wireless power receiver drives its controller and communication unit by receiving the driving power 620. The wireless power receiver performs communication with the wireless power transmitter based on a predetermined scheme using the driving power 620. For example, the wireless power receiver may transmit/receive the data required for authentication, and based thereon, the wireless power receiver joins the wireless power network managed by the wireless power transmitter. However, if a foreign object other than a wireless power receiver is placed on the wireless power transmitter, data transmission/reception would not be performed therebetween. Accordingly, the wireless power transmitter determines in step S511 whether the object placed thereon is a foreign object. For example, upon failure to receive a response from the object for a preset time, the wireless power transmitter determines the object to be a foreign object. If the wireless power transmitter determines that the object is not a foreign object in step S511, the object which is a wireless power receiver, joins the wireless power network managed by the wireless power transmitter in step S519.

If the object is determined to be a foreign object in step S511, the wireless power transmitter enters the latch fault mode in step S513. For example, the wireless power transmitter may periodically apply first powers 631 to 634 in FIG. 6 at a first cycle. The wireless power transmitter may detect a change in impedance while applying the first powers. For example, if the foreign object is removed, the wireless power transmitter may detect a change in impedance, and the wireless power transmitter determines that the foreign object is removed. If the foreign object is not removed, the wireless power transmitter may not detect a change in impedance, and the wireless power transmitter determines that the foreign object is not removed. If the foreign object is not removed, the wireless power transmitter may output at least one of lamp light and alert tone, notifying the user that the current status of the wireless power transmitter is an error status. Accordingly, the wireless power transmitter may include an output unit for outputting at least one of the lamp light and the alert tone.

If it is determined that the foreign object has not been removed in step S515, the wireless power transmitter remains in the latch fault mode in step S513. On the other hand, if it is determined that the foreign object has been removed in step S515, the wireless power transmitter re-enters the power save mode in step S517. For example, the wireless power transmitter applies second powers 651 and 652 and third powers 661 to 665 in FIG. 6.

As described above, the wireless power transmitter enters the latch fault mode, if a foreign object other than the wireless power receiver is placed thereon. In addition, the wireless power transmitter may determine whether the foreign object is removed, depending on the change in impedance, which is caused by the power applied in the latch fault mode. In other words, a latch fault mode entry condition in the embodiments of FIGS. 5 and 6 is the arrangement of the foreign object. The wireless power transmitter may have a variety of latch fault mode entry conditions in addition to the arrangement of the foreign object. For example, the wireless power transmitter may enter the latch fault mode if the wireless power transmitter is cross-connected to the wireless power receiver placed thereon.

Figure 7:
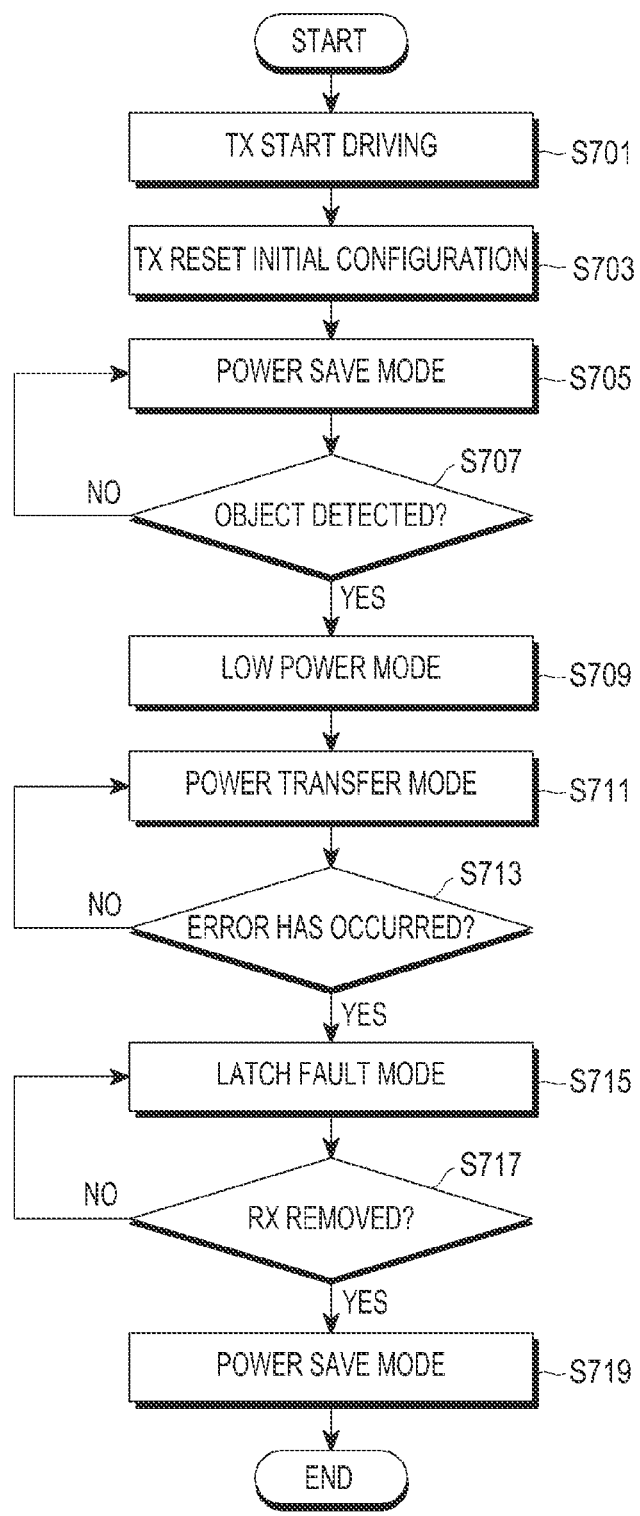
FIG. 7 is a flowchart illustrating a control method of a wireless power transmitter according to an embodiment of the present invention.

Accordingly, upon occurrence of cross connection, the wireless power transmitter is required to return to the initial status, and removal of the wireless power receiver is required. The wireless power transmitter may set, as a latch fault mode entry condition, cross connection, which occurs if a wireless power receiver placed on another wireless power transmitter joins the wireless power network managed by the wireless power transmitter. Reference will be made to FIG. 7, to describe an operation of a wireless power transmitter, which is performed when an error including cross connection occurs.

Figure 8:
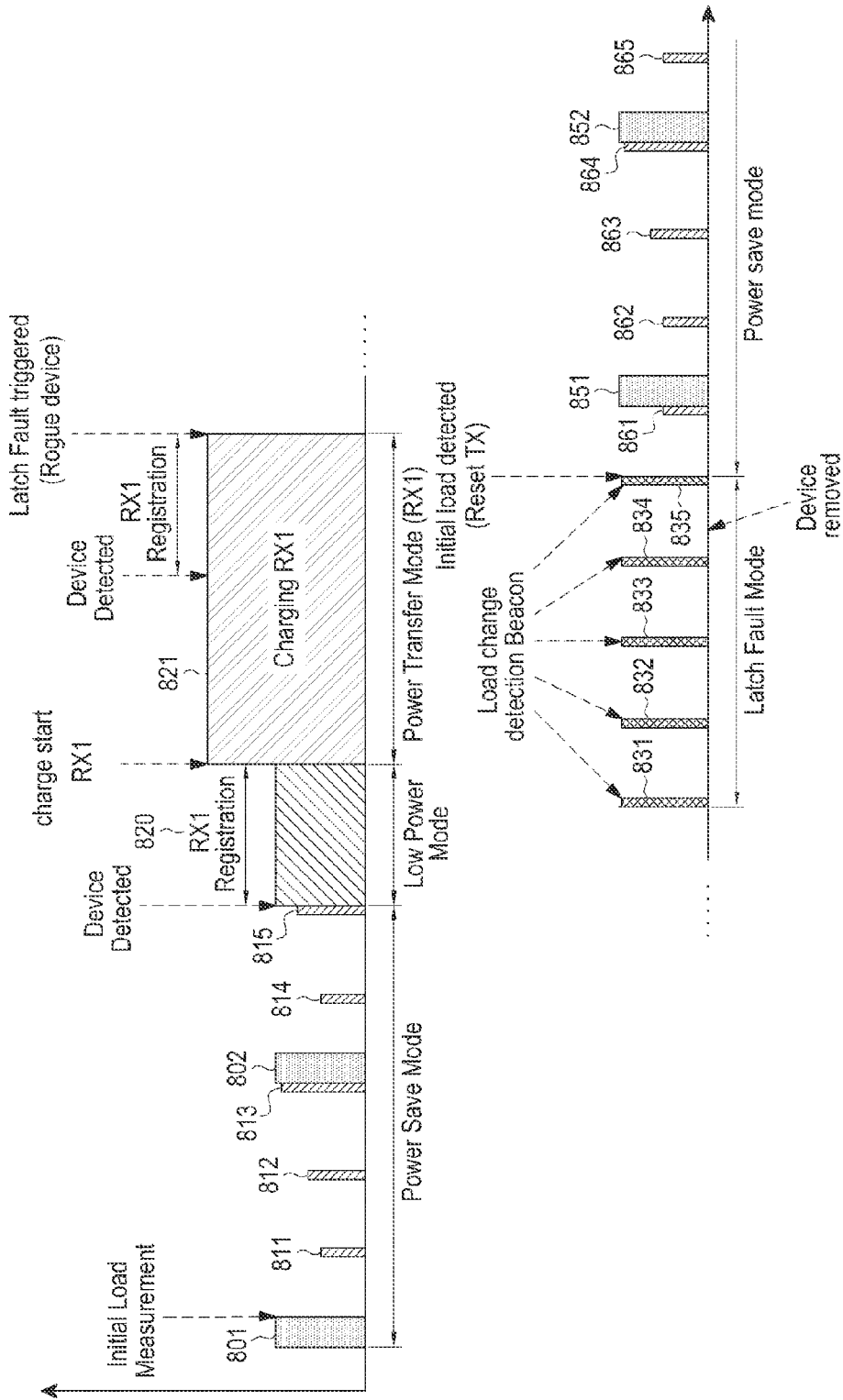
FIG. 8 is a time axis graph for power applied by a wireless power transmitter in an embodiment of FIG. 7.

FIG. 7 is a flowchart illustrating a control method of a wireless power transmitter according to an embodiment of the present invention. The control method in FIG. 7 will be described in more detail with reference to FIG. 8. FIG. 8 is a time axis graph for power applied by a wireless power transmitter in an embodiment of FIG. 7.

As illustrated in FIG. 7, a wireless power transmitter starts its driving in step S701. In addition, the wireless power transmitter resets an initial configuration (or initial settings) in step S703. The wireless power transmitter enters the power save mode in step S705. The power save mode may correspond to an interval in which the wireless power transmitter applies powers having different power levels to its power transmitting unit. For example, the power save mode may correspond to an interval in which the wireless power transmitter applies second powers 801 and 802 and third powers 811, 812, 813, 814 and 815 in FIG. 8, to the power transmitting unit. The wireless power transmitter may periodically apply the second powers 801 and 802 at a second cycle, and when applying the second powers 801 and 802, the wireless power transmitter may apply the second powers 801 and 802 for a second period. The wireless power transmitter may periodically apply the third powers 811, 812, 813, 814 and 815 at a third cycle, and when applying the third powers 811, 812, 813, 814 and 815, the wireless power transmitter may apply the third powers 811, 812, 813, 814 and 815 for a third period. Although a power value for each of the third powers 811, 812, 813, 814 and 815 is illustrated as being different from each other, the power value for each of the third powers 811, 812, 813, 814 and 815 may be different from, or equal to, each other.

The second powers 801 and 802 may be the power that can drive the wireless power receiver. More specifically, the second powers 801 and 802 may have a power level capable of driving a controller and a communication unit in the wireless power receiver.

The wireless power transmitter applies the second powers 801 and 802 and the third powers 811, 812, 813, 814 and 815 to the power receiving unit at a second cycle and a third cycle, respectively. If the wireless power receiver is placed on the wireless power transmitter, the impedance seen at one point of the wireless power transmitter may be changed. The wireless power transmitter may detect the change in impedance while the second powers 801 and 802 and the third powers 811, 812, 813, 814 and 815 are applied. For example, the wireless power transmitter may detect a change in impedance while applying the third power 815. Accordingly, the wireless power transmitter detects an object in step S707. If no object is detected in step S707, the wireless power transmitter remains in the power save mode, in which the wireless power transmitter periodically applies different powers, in step S705.

On the other hand, if an object is detected due to the change in impedance in step S707, the wireless power transmitter enters the low power mode in step S709. The low power mode is a mode in which the wireless power transmitter applies driving power having a power level capable of driving a controller and a communication unit in the wireless power receiver. For example, in FIG. 8, the wireless power transmitter applies driving power 820 to its power transmitting unit. The wireless power receiver drives its controller and communication unit by receiving the driving power 820. The wireless power receiver performs communication with the wireless power transmitter based on a predetermined scheme using the driving power 820. For example, the wireless power receiver may transmit/receive the data required for authentication, and based thereon, the wireless power receiver may join the wireless power network managed by the wireless power transmitter.

Thereafter, the wireless power transmitter enters the power transfer mode, in which the wireless power transmitter transmits charging power, in step S711. For example, the wireless power transmitter may apply charging power 821 as in FIG. 8, and the charging power may be transmitted to the wireless power receiver.

In the power transfer mode, the wireless power transmitter determines in step S713 whether an error occurs. Herein, the error may include a foreign object being placed on a wireless power transmitter, cross connection, over voltage, over current, over temperature, and the like. The wireless power transmitter may include a sensing unit capable of measuring the over voltage, over current, over temperature, and the like. For example, the wireless power transmitter may measure a power or a current at a reference point, and if the measured voltage or current exceeds a threshold, the wireless power transmitter determines that over-voltage or over-current conditions are met. The wireless power transmitter may include a temperature sensing means, and the temperature sensing means may measure the temperature at a reference point of the wireless power transmitter. If the temperature at the reference point exceeds a threshold, the wireless power transmitter determines that the over-temperature conditions are met.

Although an error, which occurs when a foreign object is additionally placed on the wireless power transmitter, is illustrated in the embodiment of FIG. 8, the error is not limited thereto, and it will be apparent to those of ordinary skill in the art that the wireless power transmitter may operate in a similar process, even upon occurrence of a foreign object being placed on the wireless power transmitter, cross connection, over voltage, over current, over temperature, and the like.

If no error occurs in step S713, the wireless power transmitter remains in the power transfer mode in step S711. On the other hand, if an error occurs in step S713, the wireless power transmitter enters the latch fault mode in step S715. For example, the wireless power transmitter may apply first powers 831 to 835 as in FIG. 8. In addition, the wireless power transmitter may output an error indication including at least one of lamp light and alert tone during the latch fault mode. If it is determined in step S717 that a foreign object or a wireless power receiver has not been removed, the wireless power transmitter remains in the latch fault mode in step S715. On the contrary, if it is determined in step S717 that a foreign object or a wireless power receiver has been removed, the wireless power transmitter re-enters the power save mode in step S719. For example, the wireless power transmitter may apply second detection powers 851 and 852 and third detection powers 861 to 865 in FIG. 8.

So far, a description has been made of an operation performed when an error occurs while the wireless power transmitter transmits charging power. A description will now be made of an operation performed when a plurality of wireless power receives on a wireless power transmitter receive charging power.

Figure 9:
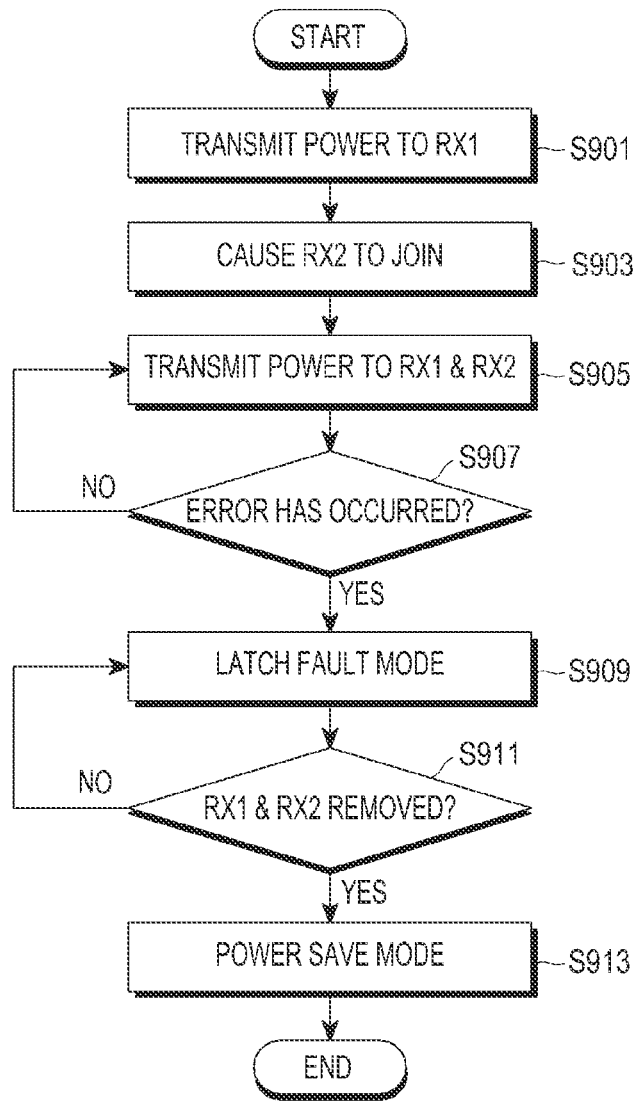
FIG. 9 is a flowchart illustrating a control method of a wireless power transmitter according to an embodiment of the present invention.
Figure 10:
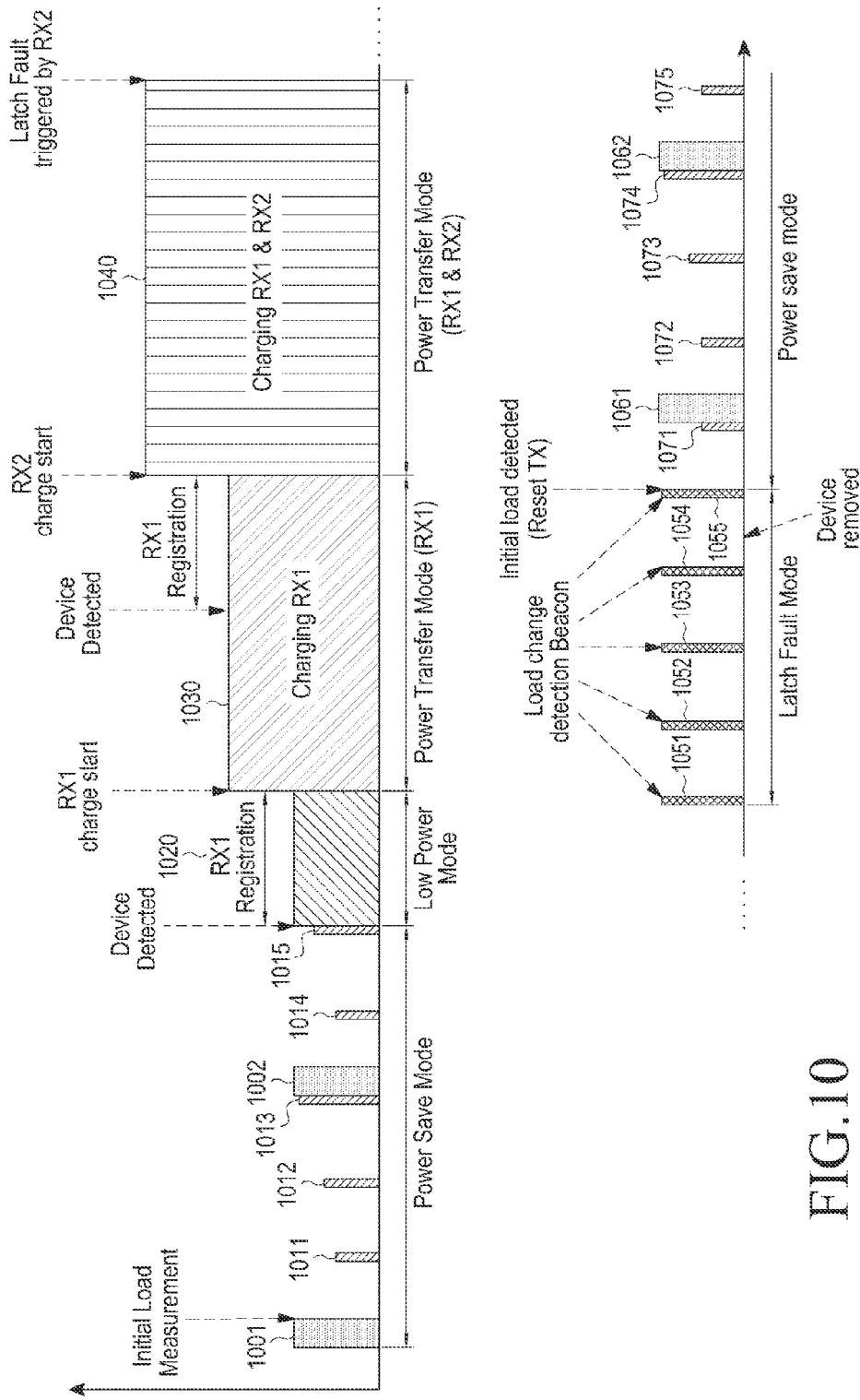
FIG. 10 is a time axis graph for power applied by a wireless power transmitter in an embodiment of FIG. 9.

FIG. 9 is a flowchart illustrating a control method of a wireless power transmitter according to an embodiment of the present invention. The control method in FIG. 9 will be described in more detail with reference to FIG. 10. FIG. 10 is a time axis graph for power applied by a wireless power transmitter in an embodiment of FIG. 9.

As illustrated in FIG. 9, a wireless power transmitter transmits charging power to a first wireless power receiver in step S901. In addition, the wireless power transmitter may cause a second wireless power receiver to join the wireless power network in step S903. The wireless power transmitter also transmits charging power to the second wireless power receiver in step S905. More specifically, the wireless power transmitter may apply, to the power receiving units, a sum of the charging power required by the first wireless power receiver and the charging power required by the second wireless power receiver.

An example of steps S901 to S905 is illustrated in FIG. 10. For example, the wireless power transmitter remains in the power save mode in which the wireless power transmitter applies second powers 1001 and 1002 and third powers 1011 to 1015. Thereafter, upon detecting the first wireless power receiver, the wireless power transmitter enters the low power mode in which the wireless power transmitter keeps detection power 1020. Thereafter, the wireless power transmitter enters the power transfer mode in which the wireless power transmitter applies first charging power 1030. The wireless power transmitter detects the second wireless power receiver, and causes the second wireless power receiver to join the wireless power network. In addition, the wireless power transmitter may apply second charging power 1040 that has the total power level corresponding to a power level required by the first wireless power receiver and a power level required by the second wireless power receiver.

Referring back to FIG. 9, the wireless power transmitter detects whether an error has occurred in step S907 while transmitting the charging power to both of the first and second wireless power receivers in step S905. As described above, the error may include arrangement of a foreign object, cross connection, over voltage, over current, over temperature, and the like. If no error occurs in step S907, the wireless power transmitter continues to apply the second charging power 1040.

On the other hand, if an error occurs in step S907, the wireless power transmitter enters the latch fault mode in step S909. For example, the wireless power transmitter may apply first powers 1051 to 1055 in FIG. 10 at a first cycle. The wireless power transmitter determines in operation S911 whether both of the first wireless power receiver and the second wireless power receiver have been removed. For example, the wireless power transmitter may detect a change in impedance while applying the first powers 1051 to 1055. Based on whether the impedance returns to its initial value, the wireless power transmitter may determine whether both of the first wireless power receiver and the second wireless power receiver are removed.

If it is determined that both of the first wireless power receiver and the second wireless power receiver have been removed in step S911, the wireless power transmitter enters the power save mode in step S913. For example, the wireless power transmitter may apply second powers 1061 and 1062 and third powers 1071 to 1075 in FIG. 10 at a second cycle and a third cycle, respectively.

As described above, even when applying charging power to a plurality of wireless power receivers, the wireless power transmitter may easily determine whether a wireless power receiver or a foreign object is removed, upon occurrence of an error.

Figure 11:
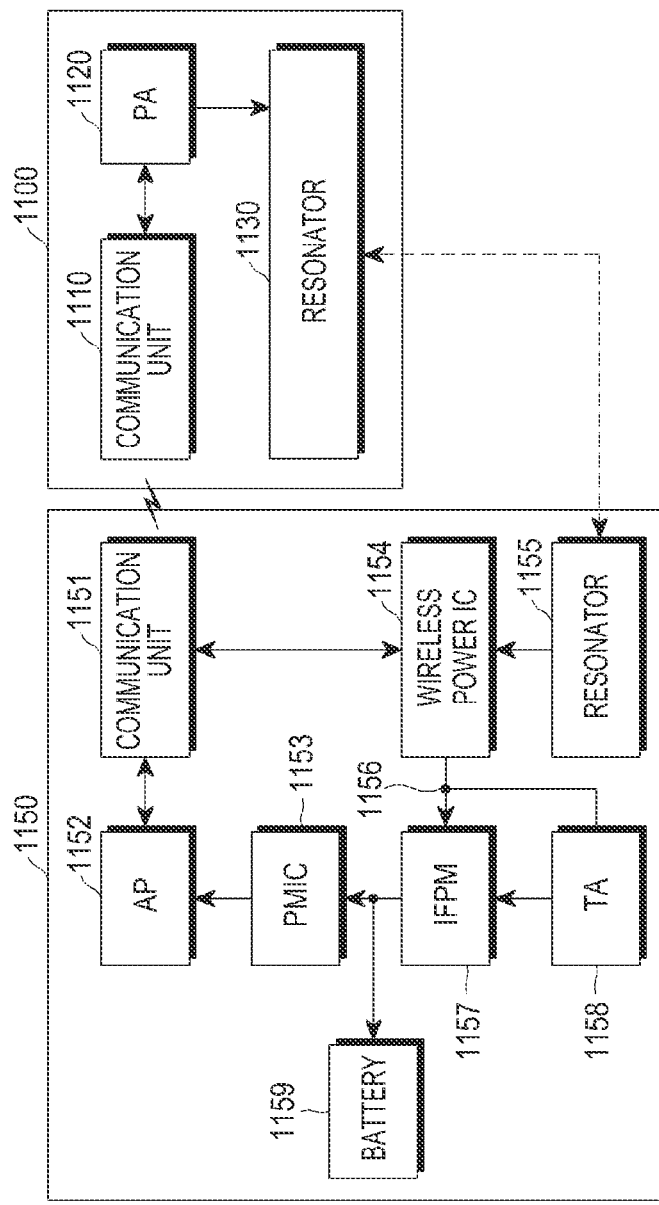
FIG. 11 is a block diagram of a wireless power transmitter and a wireless power receiver according to an embodiment of the present invention.

FIG. 11 is a block diagram of a wireless power transmitter and a wireless power receiver according to an embodiment of the present invention.

A wireless power transmitter 1100 includes a communication unit 1110, a Power Amplifier (PA) 1120 and a resonator 1130. A wireless power receiver 1150 includes a communication unit 1151, an Application Processor (AP) 1152, a Power Management Integrated Circuit (PMIC) 1153, a wireless power integrated circuit 1154, a resonator 1155, an Interface Power Management IC (IFPM) 1157, a wired charging adapter (also known as a Travel Adapter (TA)) 1158, and a battery 1159.

The communication unit 1110 performs communication with the communication unit 1151 based on a predetermined scheme (e.g., BLE scheme). For example, the communication unit 1151 in the wireless power receiver 1150 may transmit a PRU Dynamic signal having the data structure of Table 3 to the communication unit 1110 in the wireless power transmitter 1100. As described above, the PRU Dynamic signal may include at least one of voltage information, current information, temperature information and alert information of the wireless power receiver 1150.

Based on the received PRU Dynamic signal, an output power value from the power amplifier 1120 may be adjusted. For example, if over voltage, over current or over temperature is applied to the wireless power receiver 1150, a power value output from the power amplifier 1120 may be reduced. In addition, if the voltage or current of the wireless power receiver 1150 is less than a preset value, the power value output from the power amplifier 1120 may increase.

The charging power from the resonator 1130 is wirelessly transmitted to the resonator 1155.

The wireless power integrated circuit 1154 rectifies the charging power received from the resonator 1155, and performs DC/DC conversion on the rectified charging power. The wireless power integrated circuit 1154 may drive the communication unit 1151 with the converted power, or may charge the battery 1159 with the converted power.

A wired charging terminal may be inserted in the wired charging adapter (TA) 1158. In the wired charging adapter 1158, a wired charging terminal such as a 30-pin connector, a Universal Serial Bus (USB) connector or the like may be inserted. The wired charging adapter 1158 may receive power supplied from an external power source, and charge the battery 1159 with the received power.

The interface power management integrated circuit 1157 processes the power received from the wired charging terminal, and outputs the processed power to the battery 1159 and the power management integrated circuit 1153.

The power management integrated circuit 1153 manages the power received wirelessly or by wires, and the power applied to each of the components of the wireless power receiver 1150. The AP 1152 receives power information from the power management integrated circuit 1153, and controls the communication unit 1151 to transmit a PRU Dynamic signal for reporting the received power information.

A node 1156 connected to the wireless power integrated circuit 1154 may also be connected to the wired charging adapter 1158. If a wired charging connector (or a wired charging terminal) is inserted in the wired charging adapter 1158, a preset voltage (e.g., 5V) may be applied to the node 1156. The wireless power integrated circuit 1154 monitors a voltage applied to the node 1156, to determine whether the wired charging adapter 1158 is inserted.

Figure 12A:
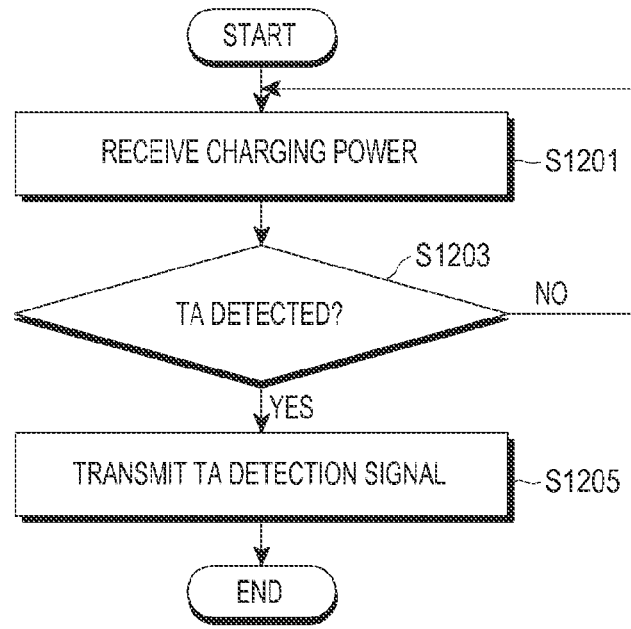
FIG. 12A is a flowchart illustrating a control method of a wireless power receiver according to an embodiment of the present invention.

FIG. 12A is a flowchart illustrating a control method of a wireless power receiver according to an embodiment of the present invention.

Referring to FIG. 12A, the wireless power receiver 1150 wirelessly receives charging power from the wireless power transmitter 1100 in step S1201. The wireless power receiver 1150 determines in step S1203 whether a wired charging terminal is inserted in a wired charging adapter (TA). For example, the wireless power receiver 1150 may determine whether the wired charging terminal is inserted in the wired charging adapter, by determining whether a voltage applied to a rear end of the wired charging adapter corresponds to a preset voltage value.

If it is determined that the wired charging terminal is inserted in step S1203, the wireless power receiver 1150 transmits a signal indicating the insertion of the wired charging terminal, to the wireless power transmitter 1100 in step S1205. For example, the wireless power receiver 1150 may transmit, to the wireless power transmitter 1100, a PRU Dynamic signal indicating TA detect (3) in a PRU alert field in Table 4. The wireless power receiver 1150 transmits a signal indicating the insertion of the wired charging terminal to the wireless power transmitter 1100 as a signal different from the PRU Dynamic signal. The wireless power receiver 1150 stops wireless charging by releasing the connection to the resonator 1155.

Figure 12B:
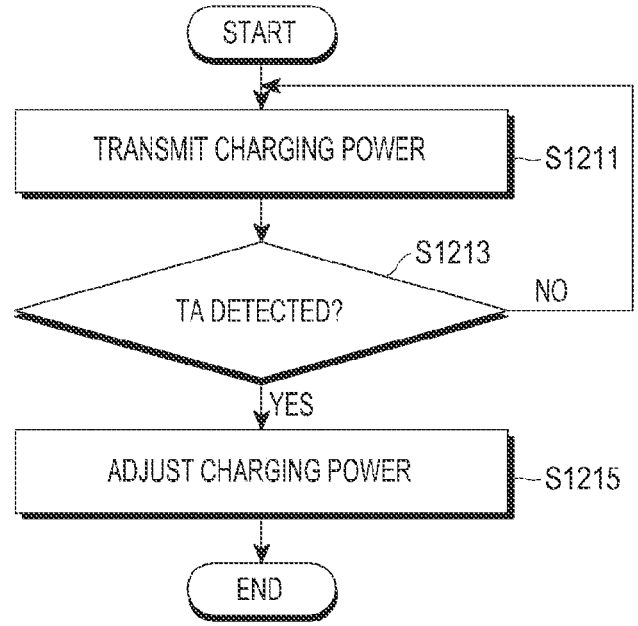
FIG. 12B is a flowchart illustrating a control method of a wireless power transmitter according to an embodiment of the present invention.

FIG. 12B is a flowchart illustrating a control method of a wireless power transmitter according to an embodiment of the present invention.

Referring to FIG. 12B, the wireless power transmitter 1100 wirelessly transmits charging power to the wireless power receiver 1150 in step S1211. The wireless power transmitter 1100 receives a signal indicating the insertion of the wired charging terminal from the wireless power receiver 1150 in step S1213. If the signal indicating the insertion of the wired charging terminal is received in step S1213, the wireless power transmitter 1100 adjusts the charging power in step S1215. For example, the wireless power transmitter 1100 may stop the transmission of the charging power by adjusting the charging power to zero (0).

As described above, if the wireless power receiver 1150 performs wired charging, the wireless power transmitter 1100 stops the wireless charging, preventing overpower from being applied.

Figure 13:
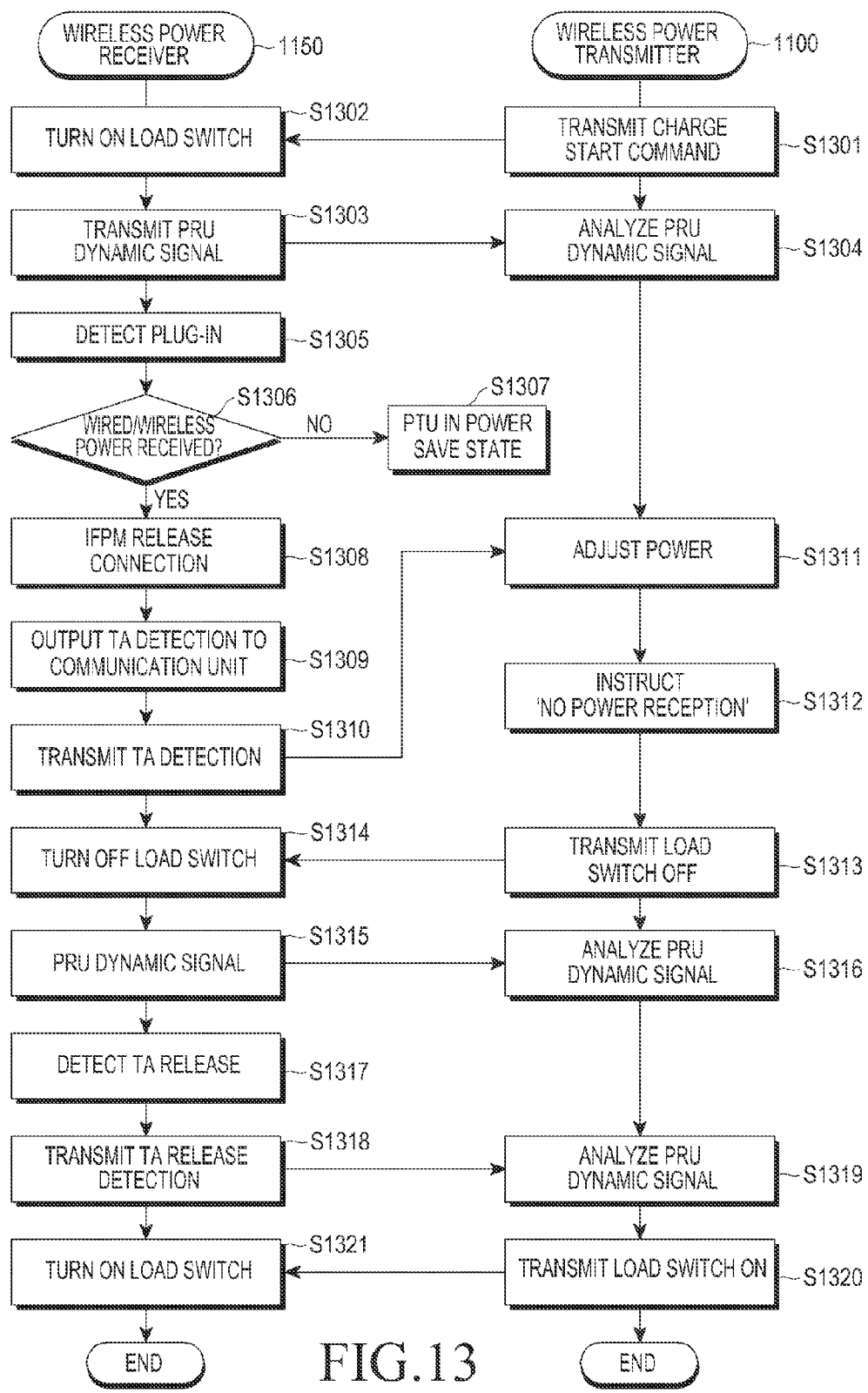
FIG. 13 is a flowchart illustrating operations of a wireless power transmitter and a wireless power receiver according to an embodiment of the present invention.

FIG. 13 is a flowchart illustrating operations of a wireless power transmitter and a wireless power receiver according to an embodiment of the present invention.

Referring to FIG. 13, the wireless power transmitter 1100 transmits a charging start command signal to the wireless power receiver 1150 in step S1301. In response thereto, the wireless power receiver 1150 performs wireless charging by turning on a load switch in step S1302. The wireless power receiver 1150 transmits a PRU Dynamic signal in step S1303, and the wireless power transmitter 1100 receives and analyzes the PRU Dynamic signal in step S1304. Accordingly, the wireless power transmitter 1100 may determine information about voltage, current and temperature of the wireless power receiver 1150, or wireless charging environment change information such as information about insertion of the wired charging terminal.

A user may insert the wired charging terminal in the wireless power receiver 1150, and the wireless power receiver 1150 detects the insertion in step S1305. The wireless power receiver 1150 determines in step S1306 whether wired or wireless power is received. If neither of the wired nor wireless power is received in step S1306, the wireless power receiver 1150 enters the power save mode in step S1307. However, if it is determined that both of wired charging and wireless charging are performed in step S1306, the IFPM 1157 in the wireless power receiver 1150 stops the wireless charging by releasing the connection from the resonator 1155 in step S1308.

The wireless power receiver 1150 outputs information indicating the detection of the insertion of the wired charging terminal to the communication unit 1151 in step S1309, and the communication unit 1151 transmits a signal indicating the detection of the insertion of the wired charging terminal to the wireless power transmitter 1100 in step S1310. In response thereto, the wireless power transmitter 1100 adjusts the charging power in step S1311. For example, the wireless power transmitter 1100 may stop the wireless charging by adjusting the charging power to zero (0).

The wireless power transmitter 1100 instructs 'no power reception' in step S1312, and the wireless power transmitter 1100 transmits a load switch OFF signal to the wireless power receiver 1150 in step S1313. Upon receiving the load switch OFF signal, the wireless power receiver 1150 may turns off the load switch in step S1314.

Even after that, the wireless power receiver 1150 may periodically transmit a PRU Dynamic signal in step S1315. The wireless power transmitter 1100 receives and analyzes the PRU Dynamic signal in step S1316.

The wireless power receiver 1150 detects the release (or plug-out) of the wired charging terminal (TA) in step S1317. For example, the wireless power receiver 1150 may detect the release of the wired charging terminal by detecting a change in voltage applied to a rear end of the wired charging adapter 1158. The wireless power receiver 1150 transmits a signal indicating the detection of the release of the wired charging terminal to the wireless power transmitter 1100 in step S1318. For example, the wireless power receiver 1150 may transmit the signal indicating the detection of the release of the wired charging terminal as a PRU Dynamic signal or a single signal. The wireless power transmitter 1100 analyzes the PRU Dynamic signal or the single signal and determines that the insertion of the wired charging terminal into the wireless power receiver 1150 is released, in step S1319.

The wireless power transmitter 1100 transmits a load switch ON signal to the wireless power receiver 1150 in step S1320, and upon receiving the load switch ON signal, the wireless power receiver 1150 turns on the load switch in step S1321. The wireless power transmitter 1100 performs wireless charging by re-adjusting the charging power, and the wireless power receiver 1150 performs wireless charging by turning on the load switch.

As described above, the wireless power transmitter 1100 may determine whether the wired charging terminal is inserted in, or drawn out from the wireless power receiver 1150. The wireless power transmitter 1100 may adjust the charging power depending on whether the wired charging terminal is inserted in, or drawn out from the wireless power receiver 1150, thereby preventing the waste of power and preventing overpower from being applied to the wireless power receiver 1150.

Figure 14:
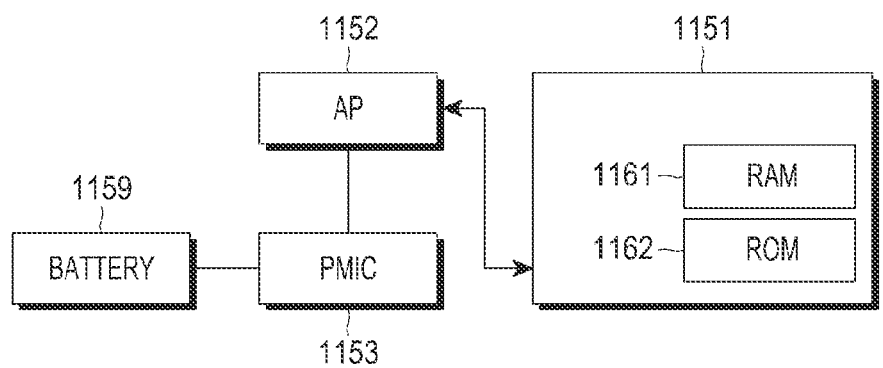
FIG. 14 is a block diagram of a communication unit and peripheral components of a wireless power receiver according to an embodiment of the present invention.

FIG. 14 is a block diagram of a communication unit and peripheral components of a wireless power receiver according to an embodiment of the present invention.

As illustrated in FIG. 14, the communication unit 1151 of the wireless power receiver 1150 includes a Random Access Memory (RAM) 1161, and a Read Only Memory (ROM) 1162. The communication unit 1151 performs communication with the wireless power transmitter 1100 based on a predetermined scheme (e.g., BLE scheme). Accordingly, a stack (e.g., BLE stack) of the predetermined communication scheme needs to be loaded in the RAM 1161 of the communication unit 1151. The communication unit 1151 may receive a BLE stack from the AP 1152, and load the BLE stack in the RAM 1161. As such, a mode in which the communication unit 1151 receives a stack of a predetermined communication scheme from the AP 1152 and loads the stack in the RAM 1161 is referred to as a Non-Stand Alone (NSA) mode.

The wireless power receiver 1150 is placed on the wireless power transmitter 1100 after the battery 1159 is discharged. In this case, the wireless power receiver 1150 cannot drive the AP 1152 since the battery 1159 is discharged.

The wireless power receiver 1150 drives the communication unit 1151 of the wireless power receiver 1150 by receiving detection-purpose power beacons. However, since the AP 1152 cannot be driven as stated above, the communication unit 1151 may not receive the stack of the predetermined communication scheme from the AP 1152. The communication unit 1151 may store the stack of the predetermined communication scheme in the ROM 1162, and performs communication with the wireless power transmitter 1100 using the stack of the predetermined communication scheme, which is stored in the ROM 1162. As described above, a mode in which the communication unit 1151 performs communication using the stack of the predetermined communication scheme, which is stored in the ROM 1162, is referred to as a Stand Alone (SA) mode.

Figure 15A:
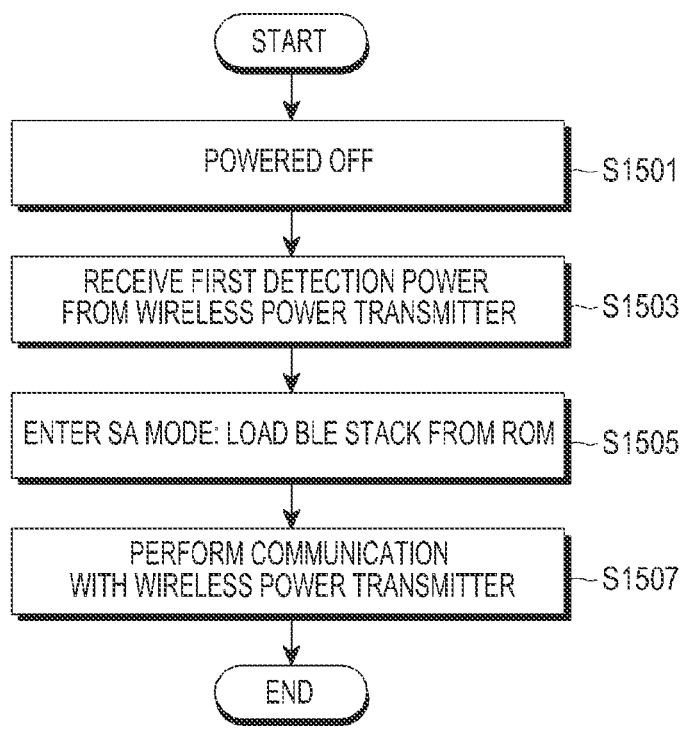
FIG. 15A is a flowchart illustrating a control method of a wireless power receiver according to an embodiment of the present invention.

FIG. 15A is a flowchart illustrating a control method of a wireless power receiver according to an embodiment of the present invention.

Referring to FIG. 15A, the wireless power receiver 1150 is powered off due to the discharge of the battery 1159 in step S1501. The wireless power receiver 1150 receives first power capable of driving the communication unit 1151, from the wireless power transmitter 1100 in step S1503, and drives the communication unit 1151 using the received power. The wireless power receiver 1150 enters the SA mode, and loads a BLE stack for example, from the ROM in step S1505. The communication unit 1151 of the wireless power receiver 1150 performs communication with the wireless power transmitter 1100 using the loaded BLE stack in step S1507.

Figure 15B:
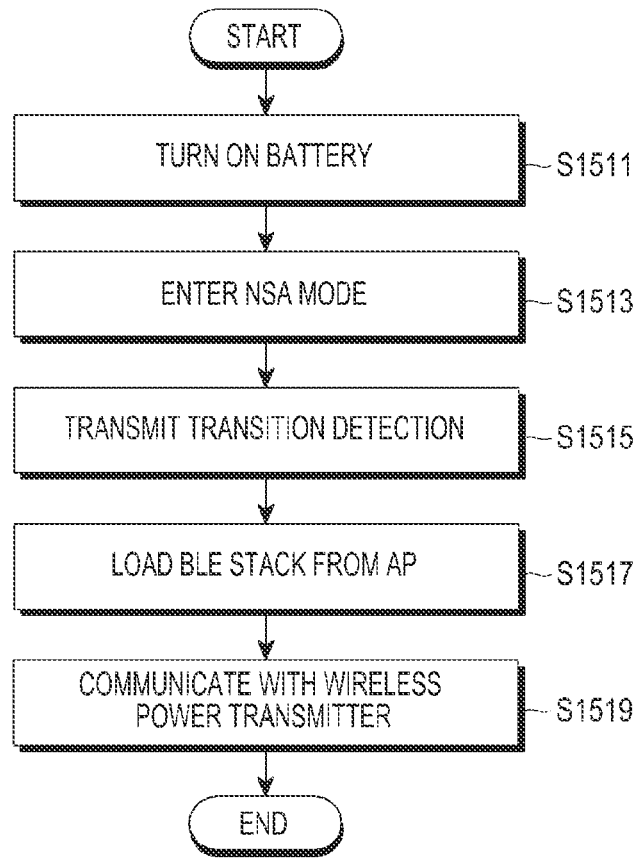
FIG. 15B is a flowchart illustrating a control method of a wireless power receiver according to an embodiment of the present invention.

FIG. 15B is a flowchart illustrating a control method of a wireless power receiver according to an embodiment of the present invention.

Referring to FIG. 15B, the wireless power receiver 1150 performs wireless charging while operating in the SA mode. Based on the wireless charging, the wireless power receiver 1150 turns on the battery 1159 and the AP 1152 in step S1511. The wireless power receiver 1150 transitions from the SA mode to the NSA mode in step S1513. The wireless power receiver 1150 transmits a mode transition detection signal to the wireless power transmitter 1100 in step S1515. The wireless power receiver 1150 loads a BLE stack from the AP 1152 in step S1517, and resumes the communication with the wireless power transmitter 1100 in step S1519.

Figure 15C:
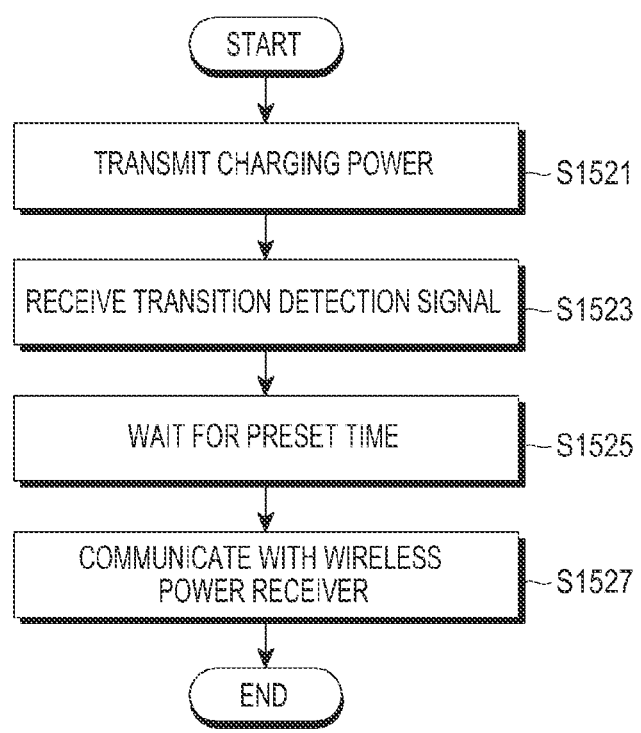
FIG. 15C is a flowchart illustrating a control method of a wireless power transmitter according to an embodiment of the present invention.

FIG. 15C is a flowchart illustrating a control method of a wireless power transmitter according to an embodiment of the present invention.

Referring to FIG. 15C, the wireless power transmitter 1100 transmits charging power to the wireless power receiver 1150 in step S1521. The wireless power transmitter 1100 receives a detection signal indicating transition from the SA mode to the NSA mode from the wireless power receiver 1150 in step S1523. The wireless power transmitter 1100 waits for a preset waiting time in step S1525. For example, the wireless power transmitter 1100 may be set to exclude the wireless power receiver 1150 from the wireless power network if no signal is received from the wireless power receiver 1150 for one second. However, if a detection signal indicating transition from the SA mode to the NSA mode is received from the wireless power receiver 1150, the wireless power transmitter 1100 does not exclude the wireless power receiver 1150 from the wireless power network even if no signal is received from the wireless power receiver 1150 for a preset waiting time.

If the preset waiting time has elapsed, the wireless power transmitter 1100 resumes communication with the wireless power receiver 1150 in step S1527.

As described above, if the wireless power receiver 1150 transitions from the SA mode to the NSA mode, its communication with the wireless power transmitter 1100 may be cut off for a predetermined time. However, by receiving a transition signal from the SA mode to the NSA mode from the wireless power receiver 1150, the wireless power transmitter 1100 does not exclude the wireless power receiver 1150 from the wireless power network, even if no signal is received from the wireless power receiver 1150 for a preset waiting time. As a result, it is possible to prevent an error from unintentionally occurring due to the mode transition of the wireless power receiver.

As described above, the wireless power transmitter 1100 may determine changes in wireless power transmission environment, such as the mode transition, and does not exclude the wireless power receiver 1150 from the wireless power network in response to the changes in wireless power transmission environment.

Figure 16:
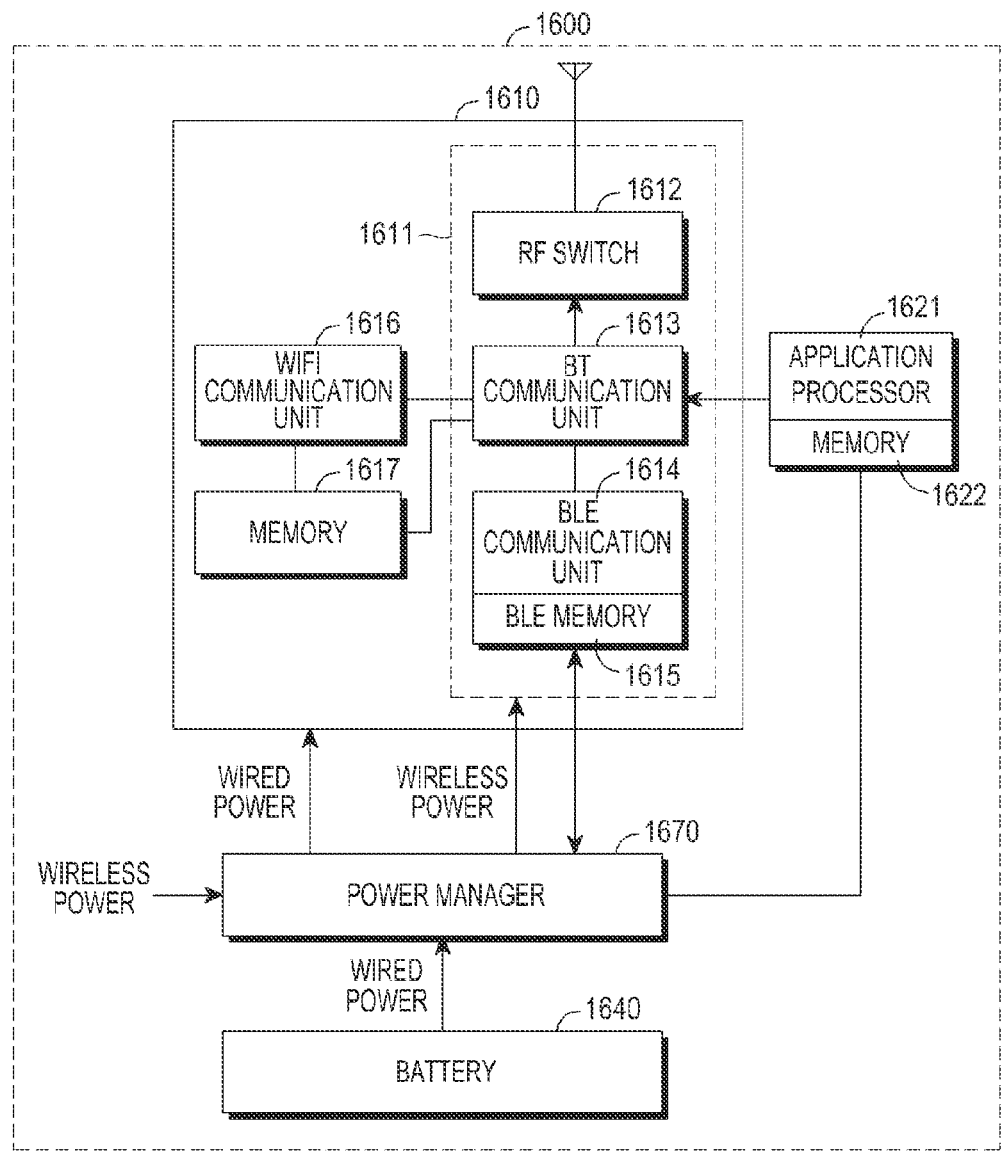
FIG. 16 is a block diagram of a wireless power receiver according to an embodiment of the present invention.

FIG. 16 is a block diagram of a wireless power receiver according to an embodiment of the present invention. As illustrated in FIG. 16, an application processor 1621 of a wireless power receiver 1600 includes a memory 1622. In addition, a communication unit 1611 also individually includes a BLE memory 1615. The memory 1622 of the application processor 1621 may store a public address for communication of the wireless power receiver 1600. In addition, the BLE memory 1615 may store a stack (e.g., BLE stack) for communication. More specifically, the BLE memory 1615 may also store the public address.

The wireless power receiver 1600 may use addresses defined in Table 5 below, in each of the SA mode and the NSA mode.

TABLE 5

| Address in SA mode | Address in NSA mode |
| --- | --- |
| Random address | Random address same as that in SA mode |
| Random address | Public address |
| Public address | Public address |
| First random address | Second random address |

Each situation in Table 5 will be described in more detail below.

1. Way to Keep Using Random Address

The wireless power receiver 1600 performs communication with the wireless power transmitter 1100 using a random address in the SA mode. The random address may be generated by the wireless power receiver 1600.

The wireless power receiver 1600, as described above, transmits a mode transition detection signal to the wireless power transmitter 1100. In this case, the wireless power receiver 1600 may store the random address it has used in the SA mode, while transmitting the mode transition detection signal.

The wireless power transmitter 1100 receives the mode transition detection signal, and stores the random address it has used in the SA mode.

The wireless power receiver 1600 transitions to the NSA mode, and may use the same random address it has used in the SA mode, even in the NSA mode. The wireless power transmitter 1100 may also use the same random address it has used in the SA mode. Accordingly, the wireless power transmitter 1100 and the wireless power receiver 1600 perform communication using the random address they have used in the SA mode, even in the NSA mode. Upon transition of the mode, the wireless power transmitter 1100 keeps applying the charging power, and does not determine the wireless power receiver 1600 to be a foreign object even if no signal is received from the wireless power receiver 1600 for a preset time.

2. Way to Change Random Address to Public Address

The wireless power receiver 1600 performs communication with the wireless power transmitter 1100 using a random address in the SA mode.

When transitioning from the SA mode to the NSA mode, the wireless power receiver 1600 obtains a public address from the application processor 1621 and stores the public address in the RAM. The wireless power receiver 1600 transmits a mode transition detection signal to the wireless power transmitter 1100. The mode transition detection signal may include public address information. The wireless power transmitter 1100 checks information about the public address to be used in the NSA mode, by analyzing the received mode transition detection signal.

The wireless power receiver 1600 performs mode transition from the SA mode to the NSA mode. In addition, the wireless power receiver 1600 performs communication with the wireless power transmitter 1100 using the public address. The wireless power transmitter 1100 may also perform communication with the wireless power receiver 1600 using the public address obtained from the mode transition detection signal. Upon transition of the mode, the wireless power transmitter 1100 keeps applying the charging power, and does not determine the wireless power receiver 1600 to be a foreign object even if no signal is received from the wireless power receiver 1600 for a preset time.

3. Way to Keep Using Public Address

The wireless power receiver 1600 may store in advance the same public address as that of the application processor 1621 in the ROM of the communication unit 1611. Accordingly, the wireless power receiver 1600 performs communication with the wireless power transmitter 1100 using the public address even in the SA mode. The wireless power receiver 1600 transmits a mode transition detection signal to the wireless power transmitter 1100 before the mode transition.

The wireless power transmitter 1100 stores the public address of the wireless power receiver 1600. In addition, the wireless power transmitter 1100 receives the mode transition detection signal, and uses the stored public address when resuming the communication in the NSA mode. Upon transition of the mode, the wireless power transmitter 1100 keeps applying the charging power, and does not determine the wireless power receiver 1600 to be a foreign object even if no signal is received from the wireless power receiver 1600 for a preset time.

4. Way to Change First Random Address to Second Random Address

The wireless power receiver 1600 generates a first random address, and performs communication with the wireless power transmitter 1100 using the generated first random address. The wireless power receiver 1600 transitions from the SA mode to the NSA mode. The wireless power receiver 1600 transmits a mode transition detection signal to the wireless power transmitter 1100.

Upon transition of the mode, the wireless power transmitter 1100 keeps applying the charging power, and does not determine the wireless power receiver 1600 to be a foreign object even if no signal is received from the wireless power receiver 1600 for a preset time.

The wireless power receiver 1600 generates a second random address in the NSA mode. The wireless power receiver 1600 may re-perform the boot operation (step S407) in FIG. 4, using the second random address. More specifically, the wireless power receiver 1600 may perform the process of transmitting a PTU searching signal (step S410), receiving PRU response signal (step S411), transmitting PRU static signal (step S412), and receiving a PTU static signal (step S413), by using the second random address.

As is apparent from the foregoing description, various embodiments of the present invention may provide a wireless power receiver capable of performing communication with a wireless power transmitter even during discharge of its battery, and a control method thereof. In addition, various embodiments of the present invention may provide a wireless power transmitter for performing communication in response to the battery discharge, and a control method thereof. Moreover, the wireless power transmitter and the wireless power receiver may stably maintain communication even in a mode transition process, so communication for wireless charging may be stably performed.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A control method for performing wireless charging in a wireless power receiver, the control method comprising:
   receiving charging power from a wireless power transmitter;
   detecting transition of the wireless power receiver from a Stand Alone (SA) mode to a Non Stand Alone (NSA) mode;
   upon detecting the mode transition, generating a message including address information used to re-connect with the wireless power transmitter; and
   transmitting the message to the wireless power transmitter.

2. The control method of claim 1, wherein the message includes a Power Reception Unit (PRU) alert signal.

3. The control method of claim 1, further comprising:
   upon detecting the mode transition, storing the address information used to re-connect with the wireless power transmitter.

4. The control method of claim 1, further comprising:
   upon completion of the mode transition, re-connecting with the wireless power transmitter using the address information.

5. The control method of claim 4, further comprising:
   upon completion of the mode transition, loading a communication scheme stack for communication with the wireless power transmitter from an application processor of the wireless power receiver; and
   re-connecting with the wireless power transmitter using the address information, based on the loaded communication scheme stack.

6. The control method of claim 5, wherein the address information used to re-connect with the wireless power transmitter includes a public address that is different from a random address in the SA mode.

7. The control method of claim 1, wherein the address information used to re-connect with the wireless power transmitter includes a public address that is the same as a public address in the SA mode.

8. The control method of claim 1, wherein the address information used to re-connect with the wireless power transmitter includes a random address that is the same as a random address in the SA mode.

9. The control method of claim 1, wherein the address information used to re-connect with the wireless power transmitter includes a second random address that is different from a first random address in the SA mode.

10. A control method for performing wireless charging in a wireless power transmitter, the control method comprising:
    transmitting charging power to a wireless power receiver;
    receiving, from the wireless power receiver, a message including address information used to re-connect with the wireless power transmitter; and
    upon receiving the message from the wireless power receiver, reconnecting with the wireless power receiver using the address information.

11. The control method of claim 10, further comprising storing the address information to be used to re-connect with the wireless power transmitter.

12. The control method of claim 10, wherein the address information used to re-connect with the wireless power transmitter includes a public address that is different from a random address in a Stand Alone (SA) mode of the wireless power receiver.

13. The control method of claim 10, wherein the address information used to re-connect with the wireless power transmitter includes a public address that is the same as a public address in an SA mode of the wireless power receiver.

14. The control method of claim 10, wherein the address information used to re-connect with the wireless power transmitter includes a random address that is the same as a random address in an SA mode of the wireless power receiver.

15. The control method of claim 10, wherein the address information used to re-connect with the wireless power transmitter includes a second random address that is different from a first random address in an SA mode of the wireless power receiver.

* * * * *